(12) United States Patent
Zhang

(10) Patent No.: US 11,689,697 B2
(45) Date of Patent: Jun. 27, 2023

(54) SYSTEM AND METHOD FOR TRAFFIC SURVEILLANCE

(71) Applicant: SHANGHAI TRUTHVISION INFORMATION TECHNOLOGY CO., LTD., Shanghai (CN)

(72) Inventor: Zhong Zhang, Great Falls, VA (US)

(73) Assignee: SHANGHAI TRUTHVISION INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/037,729

(22) Filed: Sep. 30, 2020

(65) Prior Publication Data

US 2021/0029328 A1    Jan. 28, 2021

Related U.S. Application Data

(63) Continuation of application No. PCT/CN2019/083892, filed on Apr. 23, 2019.

(60) Provisional application No. 62/664,067, filed on Apr. 27, 2018.

(51) Int. Cl.
| | | |
|---|---|---|
| *H04N 7/18* | (2006.01) | |
| *G06T 7/20* | (2017.01) | |
| *G06V 20/52* | (2022.01) | |
| *H04N 23/90* | (2023.01) | |

(52) U.S. Cl.
CPC .............. *H04N 7/181* (2013.01); *G06T 7/20* (2013.01); *G06V 20/52* (2022.01); *H04N 7/188* (2013.01); *H04N 23/90* (2023.01); *G06T 2207/10016* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 4,992,866 A | * | 2/1991 | Morgan ........... G08B 13/19641 340/3.71 |
| 6,697,103 B1 | | 2/2004 | Fernandez et al. |
| D773,096 S | | 11/2016 | Zhu |

(Continued)

FOREIGN PATENT DOCUMENTS

| | | | |
|---|---|---|---|
| CN | 101277429 A | * | 10/2008 |
| CN | 101277429 A | | 10/2008 |

(Continued)

OTHER PUBLICATIONS

International Search Report in PCT/CN2019/083892 dated Jul. 31, 2019, 4 pages.

(Continued)

*Primary Examiner* — James M Anderson, II
(74) *Attorney, Agent, or Firm* — Metis IP LLC

(57) ABSTRACT

A method for traffic surveillance may include acquiring, from a plurality of first video sensors, a first set of images of an area, and generating a map-based surveillance interface of the area based on the first set of image data. The method may also include presenting, on a display, the map-based surveillance interface; wherein each of the plurality of first video sensors is implemented on an illuminating devices in the area, and the first set of image data denotes a plurality of views of the area captured by the plurality of first video sensors, respectively.

18 Claims, 10 Drawing Sheets

(56) References Cited

U.S. PATENT DOCUMENTS

| | | | |
|---|---|---|---|
| 9,615,066 B1* | 4/2017 | Tran | G08G 1/09 |
| 2006/0203090 A1 | 9/2006 | Wang et al. | |
| 2007/0076094 A1 | 4/2007 | Dickerson et al. | |
| 2007/0132844 A1 | 6/2007 | Katz | |
| 2008/0117296 A1 | 5/2008 | Egnal et al. | |
| 2010/0134627 A1* | 6/2010 | Yen | G06V 20/52 348/159 |
| 2011/0193966 A1* | 8/2011 | Golan | H04N 7/181 348/E7.085 |
| 2012/0098927 A1 | 4/2012 | Sablak | |
| 2014/0314275 A1 | 10/2014 | Edmondson et al. | |
| 2015/0124100 A1 | 5/2015 | McRory | |
| 2016/0125246 A1 | 5/2016 | Ryhorchuk et al. | |
| 2018/0330610 A1* | 11/2018 | Wu | G08G 1/0967 |

FOREIGN PATENT DOCUMENTS

| | | | |
|---|---|---|---|
| CN | 102081844 A | | 6/2011 |
| CN | 102724482 A | | 10/2012 |
| CN | 103237192 A | | 8/2013 |
| CN | 103248867 A | | 8/2013 |
| CN | 104092993 A | | 10/2014 |
| CN | 104363426 A | * | 2/2015 |
| CN | 104363426 A | | 2/2015 |
| CN | 105679043 A | | 6/2016 |
| CN | 105847751 A | | 8/2016 |
| CN | 107004271 A | | 8/2017 |
| CN | 107229690 A | | 10/2017 |
| CN | 107327799 A | * | 11/2017 |
| CN | 107327799 A | | 11/2017 |
| CN | 107886761 A | | 4/2018 |
| CN | 107888877 A | | 4/2018 |
| EP | 3306913 A1 | | 4/2018 |
| JP | 2004145741 A | | 5/2004 |
| KR | 101272164 B1 | | 6/2013 |
| WO | 2004068855 A1 | | 8/2004 |
| WO | 2009102098 A1 | | 8/2009 |

OTHER PUBLICATIONS

Written Opinion in PCT/CN2019/083892 dated Jul. 31, 2019, 4 pages.
First Office Action in Chinese Application No. 201980011284.5 dated May 21, 2021, 19 pages.
The Second Office Action in Chinese Application No. 201980011284.5 dated Dec. 13, 2021, 20 pages.
Zhang, Qingling et al., The Design of Intelligent Road Lighting Control System, Zhaoming Gongcheng Xuebao, 27(3), 43-48, 2016.

* cited by examiner

900

SYSTEM AND METHOD FOR TRAFFIC SURVEILLANCE

CROSS-REFERENCE TO RELATED APPLICATIONS

This application is a continuation of International Application No. PCT/CN2019/083892, filed on Apr. 23, 2019, which claims priority of U.S. Provisional Application No. 62/664,067, filed on Apr. 27, 2018, the contents of which are hereby incorporated by reference.

TECHNICAL FIELD

The present disclosure generally relates to surveillance systems, and more specifically relates to methods and systems for traffic surveillance based on video sensors coupled with illuminating devices.

BACKGROUND

Video surveillance systems are widely used in a variety of applications to detect and monitor objects within an environment. For example, such systems are applied to automated threat detection, remote notification, homeland security, (real-time) traffic analysis, or the like, or a combination thereof. In (real-time) traffic analysis, such systems are applied to vehicle tracking, traffic survey and control, traffic law enforcement, etc. The video surveillance systems may include a plurality of video sensors (e.g., cameras) installed dispersedly in a wide area. The video data acquired by the plurality of video sensors may be processed independently from each other. While this setup is sufficient for some scenarios, its effectiveness is limited by detecting only local, single camera events. More complex events spanning multiple cameras cannot be detected. To enable the system to provide a global awareness of what is going on in the whole area. It is desirable to provide systems and methods for traffic surveillance based on video sensors coupled with illuminating devices.

SUMMARY

According to an aspect of the present disclosure, a system for traffic surveillance may include a non-transitory storage medium storing a set of instructions, at least one processor in communication with the non-transitory storage medium and a communication platform connected to a network. The system may include a plurality of first video sensors configured to capture a plurality of views of an area, respectively, each of the plurality of first video sensors is implemented on an illuminating devices in the area. The system may include a data fusion module configured to generate a map-based surveillance interface of the area based on the first set of images. The system may include a presenting module configured to present the map-based surveillance interface on a display.

In some embodiment, the system may include a plurality of second video sensors configured to capture a second set of images of the area, each of the plurality of second video sensors is implemented on a motion object in the area, wherein the data fusion module is further configured to generate the map-based surveillance interface of the area based on the first set of images and the second set of images.

In some embodiment, the data fusion module is further configured to: identify a target from a first image of the first set of images; determine one or more second images from the first set of images, each including the target; and determine a motion track of the target based on the first image and the one or more second images, wherein the presenting module is further configured to present, on the display, the motion track of the target on the map-based surveillance interface.

In some embodiment, the data fusion module is further configured to generate at least one object-based surveillance interface. The presenting module is further configured to present the motion track of the target on the at least one object-based surveillance interface; and present simultaneously, on the display, the at least one object-based surveillance interface with the map-based surveillance interface.

In some embodiment, the data fusion module is further configured to retrieve one or more features related to the target based on at least one of the first image and the one or more second images. The presenting module is further configured to present the one or more features of the target on the at least one object-based surveillance interface, wherein the one or more features include at least one of a location of the target, a velocity of the target, a color of the target, or a contour of the target.

In some embodiment, the traffic analyzing module is further configured to: generate a motion pattern of the target based on the motion track of the target in a period of time; activate at least one of the plurality of first video sensors to monitor the target based on the motion pattern, wherein the motion pattern includes at least one of a temporal motion pattern, a spatial motion pattern, a social behavioral motion pattern.

In some embodiment, the traffic analyzing module is further configured to: determine one or more traffic statistics of the area based on the first set of images; determine whether a violation occurs based on the one or more traffic statistics and traffic rules related to the area; and in response to the determination that the violation occurs, transmitting an alarm signal via the network to a third party.

In some embodiment, the system may further include an event module configured to: receive, from a terminal device, an inquiry of an event; retrieve information related to the event from the non-transitory storage medium; and transmit the information related to the event to be displayed on the terminal device in response to the inquiry, wherein the information is displayed on the terminal device in at least one of a text, a form, a chart, the map-based surveillance interface, or the object-based surveillance interface.

According to an aspect of the present disclosure, a method for traffic surveillance is provided. The method may include acquiring, from a plurality of first video sensors, a first set of images of an area, and generating a map-based surveillance interface of the area based on the first set of image data. The method may also include presenting, on a display, the map-based surveillance interface; wherein each of the plurality of first video sensors is implemented on an illuminating devices in the area, and the first set of image data denotes a plurality of views of the area captured by the plurality of first video sensors, respectively.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 9:
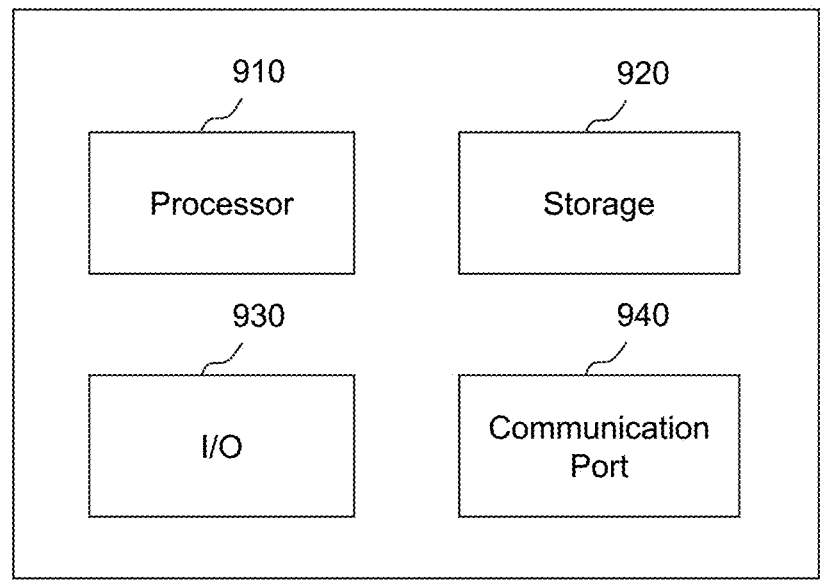
FIG. 9 is a schematic diagram illustrating exemplary hardware and/or software components of an exemplary computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 910 as illustrated in FIG. 9) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to a system and method for traffic surveillance. The system may acquire from a plurality of first video sensors, a first set of images of an area. The system may also generate a map-based surveillance interface of the area based on the first set of images. The system may further present, on a display, the map-based surveillance interface, wherein each of the plurality of first video sensors is implemented on an illuminating device in the area, and the first set of images denotes a plurality of views of the area captured by the plurality of first video sensors, respectively.

For illustration purposes, the disclosure describes systems and methods for imaging system. It should be noted that the traffic surveillance system 800 described below is merely provided for illustration purposes, and not intended to limit the scope of the present disclosure.

Figure 1:
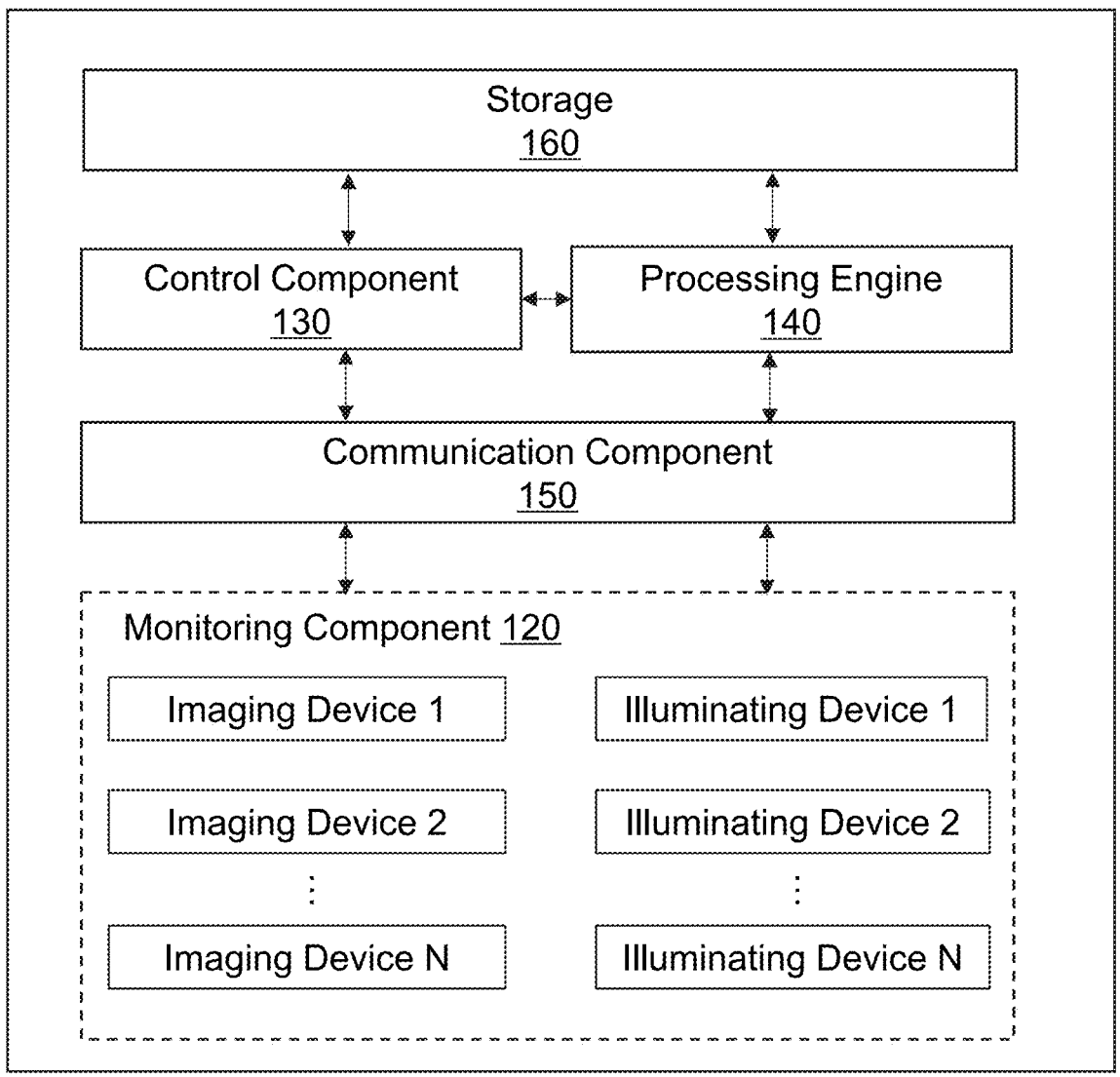
FIG. 1 is a schematic diagram illustrating an exemplary traffic surveillance system 100 according to some embodiments of the present disclosure.

FIG. 1 is a schematic diagram illustrating an exemplary traffic surveillance system 100 according to some embodiments of the present disclosure. As shown, the traffic surveillance system 100 may include a monitoring component 120, a control component 130, a processing engine 140, a communication component 150, and a storage 160. In some embodiments, the monitoring component 120, the control component 130, and the processing engine 140, and the storage 160 may be connected to and/or communicate with each other via the communication component 150 including a wireless connection (e.g., a network), a wired connection, or a combination thereof.

The monitoring component 120 may include a plurality of illuminating devices (e.g., an illuminating device 1, 2 . . . , N) and a plurality of imaging devices (e.g., an imaging device 1, 2 . . . , N).

The illuminating devices may be configured to light an area of interest (AOI). The AOI may be indoors or outdoors. For example, the AOI may include a residence, a shopping mall, an office space, a street, a road, a station, or the like, or a combination thereof. The illuminating devices may include a plurality of street lamps, landscape lamps, floodlights, cast lights, outlines lights, etc. Each of the illuminating devices may include one or more lighting parameters. Exemplary lighting parameters may include a light intensity, a light color, a color temperature, a shape of light source, a brightness, a switch state, a lighting area, etc.

The imaging devices may be positioned to perform surveillance of an area of interest (AOI). In some embodiments, the plurality of imaging devices may include multiple stationary video sensors (also referred to as first video sensors) and/or multiple mobile video sensors (also referred to as second video sensors). As used herein, a video sensor may refer to an apparatus for visual recording. The video sensor may capture image data relating to an AOI or an object of interest. The image data may include a video, an image, or a combination thereof. As used herein, the term "video" may refer to motion pictures represented in analog and/or digital form. For examples, a video may include television, movies, image sequences from a camera or other observer, computer-generated image sequences, or the like, or a combination thereof. As used herein, a sequence (also referred to as a frame) may refer to a particular image or other discrete unit within a video. A video sensor may be implemented in a video camera. The video camera may include a color camera, a digital video camera, a camera, a camcorder, a PC camera, a webcam, an infrared(IR) video camera, a low-light video camera, a thermal video camera, a CCTV camera, a pan, a tilt, a zoom (PTZ) camera, a video sensing device, or the like, or a combination thereof.

A stationary video sensor may be configured with an immobilized subject. For example, the stationary video sensor may be coupled with an illuminating device as described above, a building, or the like, or a combination thereof. Further, each of the multiple stationary sensors may be coupled with one of the illuminating devices. For example, a public area may include a plurality of street lamps. Each of the plurality of street lamps may be installed with one stationary video sensor. The coupled stationary video sensor and illuminating device (also referred to as lighting-imaging device) may share one single power source. For example, a lighting-imaging device may include a base portion that screws into a light socket. The stationary video sensor and the illuminating device of the lighting-imaging device may powered by the light socket.

A multiple motion video sensor may be mounted on a moving subject. The moving subject may include vehicles, aerial vehicles, vessels, robots, mobile terminals (e.g., a mobile phone), or the like, or a combination thereof. In some embodiments, several motion video sensors may be mounted on one single moving subject. For example, two motion video sensors may be mounted on a moving vehicle. One of the two motion video sensors may be installed in front of the moving vehicle (also referred to as a front end sensor) configured to video the front area of the moving vehicle (e.g., lanes, vehicles, license plate numbers, pedestrians, obstacles, traffic lights, etc.). The other one may be installed in the rear portion of the moving vehicle (also referred to as a rear end sensor) configured to video the rear area of the moving vehicle (e.g., lanes, vehicles, obstacles, pedestrians, etc.).

The control component 130 may be configured to control the operation of one or more components of the traffic surveillance system 100. In some embodiments, the control component 130 may operate one or more imaging devices to capture image data (e.g., an image, a video, etc.) relating to one or more areas. For example, the control component 130 may set one or more parameters (e.g., a rotation direction, a rotation angle, etc.) of an imaging device. The control component 130 may further control the processing engine 140 to process the image data to detect one or more objects. For example, the control component 130 may control the processing engine 140 to generate a map-based surveillance interface based on image data captured by one or more imaging devices. As another example, the control component 130 may control the processing engine 140 to generate a motion pattern of a target based on the map-based surveillance interface and/or the captured image data. As still an example, the control component 130 may control the processing engine 140 to determine a motion track based on image data captured by one or more imaging devices.

In some embodiments, the control component 130 may operate one or more illuminating devices to light the areas. For example, the control component 130 may set one or more lighting parameters (e.g., a switch state, a lighting area, a light color, a light intensity, etc.) of an illuminating device. As another example, the control component 130 may operate at least one of the illuminating devices to light the area associated with the at least one of the illuminating devices according to one or more lighting parameters (e.g., a switch state, a lighting area, a light color, a light intensity, etc.). In some embodiments, the control component 130 may operate one or more illuminating devices based on an instruction inputted by a user via a terminal (e.g., a mobile phone). In some embodiments, the control component 130 may operate one or more illuminating devices based on image data captured by the imaging devices associated with the illuminating devices. For example, the control component 130 may control the processing engine 140 to determine a map-based interface based on the captured image data. Further, the control component 130 may control the one or more illuminating devices based on the map-based interface.

The control component 130 may be implemented in numerous ways including dedicated hardware, software, or the like, or a combination thereof, to perform various functions. In some embodiments, the control component 130 may be implemented by mobile devices which may be network enabled, such as, a mobile phone, a smart mobile phone, a tablet pc, a laptop computer, a personal digital assistant, or the like. In some embodiments, other network-enabled devices such as a desktop computer may also be used as a control component 130. In some embodiments, the control component 130 may be further an application which may be operated on a mobile device or a fixed device, such as a smart mobile phone, a tablet pc, a desktop computer, a personal digital assistant or the like. In some embodiments, a software application or upgrade may be downloaded on to a network-enabled device to perform the functions described herein In some embodiments, the control component 130 may be a server, and the sever may be a local or remote sever. In some embodiments, the control component 130 may be also an IR remote controller. In some embodiments, the control component 130 may be configured with a screen that allow a user to interact through touch with the control component 130, for example, to retrieve and navigate a play list of audio items, control operations one or more imaging devices and/or one or more illuminating devices.

The processing engine 140 may process data and/or information obtained from the monitoring component 120, and/or the storage 160. The processing engine 140 may obtain image data (e.g., an image, a video, etc.) from at least one imaging device of the monitoring component 120 and/or the storage 160. The processing engine 140 may determine a map-based interface based on the captured image data. The processing engine 140 may perform a traffic statistic (e.g., vehicle detections, violations of traffic rules, traffic flows, etc.) based on the image data and/or the map-based interface.

In some embodiments, the processing engine 140 may identify a motion object (also referred to as a target) based on the captured image data and determine a motion track of the motion object. The processing engine 140 may further present the motion track of the motion object on a display based on the map-based interface. For example, the processing engine 140 may generate an object-based surveillance interface base on the map-based surveillance and the identified motion object. The processing engine 140 may present the motion track of the target on the object-based surveillance interface and simultaneously present the object-based surveillance interface with the map-based surveillance interface on the display. In some embodiments, the processing engine 140 may retrieve one or more features related to the motion object based on the captured image data. The processing engine 140 may present the one or more features of the motion object on the object-based surveillance interface. Exemplary features include a location of the motion object, a velocity of the motion object, a color of the motion object, a contour of the motion object, etc. In some embodiments, the processing engine 140 may generate a motion pattern of the motion object based on the motion track of the motion object in a period of time. The processing engine 140 may activate at least one of the plurality of video sensors to monitor the motion object based on the motion pattern.

In some embodiments, the processing engine 140 may receive an inquiry of an event from a terminal device (e.g., the terminal 860). The processing engine 140 may retrieve information related to the event from the non-transitory storage medium and transmit the information related to the event to be displayed on the terminal device in response to the inquiry. The information is displayed on the terminal device in a text, a form, a chart, the map-based surveillance interface, the object-based surveillance interface. The event may include an abnormal event and a normal event. The normal event may refer to an event performed by the one or more objects that may satisfy a criterion. The abnormal event may refer to an event performed by the one or more objects that may not satisfy a criterion. The criterion may be defined by laws, regulations, conventions, or the like, or a combination thereof. For example, the abnormal event may include over speeding, driving without seat belts, driving without helmet, jaywalking, collision, using mobile phone while driving, etc. The normal event may include driving according to traffic signals, moving on the crosswalk, driving with a silencer, decelerating at intersection, etc.

In some embodiments, the processing engine 140 may be a workstation or server. For example, the processing engine 140 may be a single server or a server group. The server group may be centralized or distributed. In some embodiments, the processing engine 140 may be local or remote. For example, the processing engine 140 may access information and/or data stored in the monitoring component 120 and/or the storage 160 via the communication component 150. As another example, the processing engine 140 may be directly connected to the monitoring component 120 and/or the storage 160 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof.

The communication component 150 may be configured to establish communication links between the control component 130 and the monitoring component 120. For example, the communication component 150 may reach a communication between the control component 130 and one or more imaging devices and/or illuminating devices. The communication component 150 may also be configured to establish communication links between devices in the monitoring component 120. For example, the communication component 150 may reach a communication between one or more imaging devices and/or illuminating devices. In some embodiments, the communication component 150 may be also used to establish a communication link between the control component 130 and/or the processing engine 140 with a remote server for acquiring information from the remote server.

The communication component 150 may include a telephony network, a wireless network, a data network, a wired network, or the like, or a combination thereof. The communication component 150 may be wireless or wired, which may be managed by one or more service providers. The wireless network may include Bluetooth, WLAN, Wi-Fi, Zigbee, Z-Wave, EnOcean, infra-red data association (IrDA), Ultra Wideband (UWB), Near Field Communication Services (NFC), mobile networks (2G, 3G or 4G signal), VPN, shared network, or the like, or a combination thereof. The communication protocol may be Transmission Control Protocol (TCP), User Data Protocol (UDP), Internet Protocol (TP), Hypertext transfer Protocol (HTTP), File Transfer Protocol (FTP), Simple Mail Transfer protocol (SMTP), Post Office Protocl3(POP3), or the like, or a combination thereof. The wired connection may include but not limited to RS-232, CAN, TCP/IP, optical fiber, or the like, or a combination thereof.

In some embodiments, the network may include some components or elements for providing a range of communication and network service. For example, telephony network may include a circuit-switched network, such as the public switched telephone network (PSTN), an integrated services digital network (ISDN), a private branch exchange (PBX), or other like network. The wireless network may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In some embodiments, the communication component 150 may include one or more Wi-Fi routers. The Wi-Fi router may be configured to allow at least one monitoring component 120 to connect with the control component 130. Further the Wi-Fi router may be configured to allow the control component 130 and the monitoring component 120 to access to the communication component 150.

The storage 160 may store data, instructions, and/or any other information relating to a calibration of a camera based on image data captured by the camera. In some embodiments, the storage 160 may store data obtained from the processing engine 140, the terminals 160, and/or the monitoring component 120. For example, the storage 160 may store image data acquired by the monitoring component 120. As another example, the storage 160 may store parameters of an imaging device (e.g., a rotation direction, a rotation angle, etc.) determined by the processing engine 114. As still another example, the storing module 110 may store one or more estimated values corresponding to one or more features relating to objects detected in image data. As still another example, the storage 160 may store one or more motion patterns of objects. In some embodiments, the storage 160 may store data and/or instructions that the processing engine 140 may execute or use to perform exemplary methods described in the present disclosure. For example, the storage 160 may store instructions that the processing engine 140 may execute or use to determine one or more traffic statistics of an AOI. In some embodiments, the storage 160 may include a mass storage, a removable storage, a volatile read-and-write memory, a read-only memory (ROM), or the like, or a combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storing module 110 may be implemented on a cloud platform as described elsewhere in the disclosure. In some embodiments, the storage 160 may be connected to and/or to communicate with one or more other components in the processing engine 140. One or more components in the processing engine 140 may access the data or instructions stored in the storage 160.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the traffic surveillance system 100 may be connected with a security system, a smart socket system, a smart switch system, a smart appliances system, or the like, or a combination thereof. Further the described systems may be all controlled via the control component 130. In some embodiments, the processing engine 140 and the control component 130 may be integrated into one single device.

Figure 2:
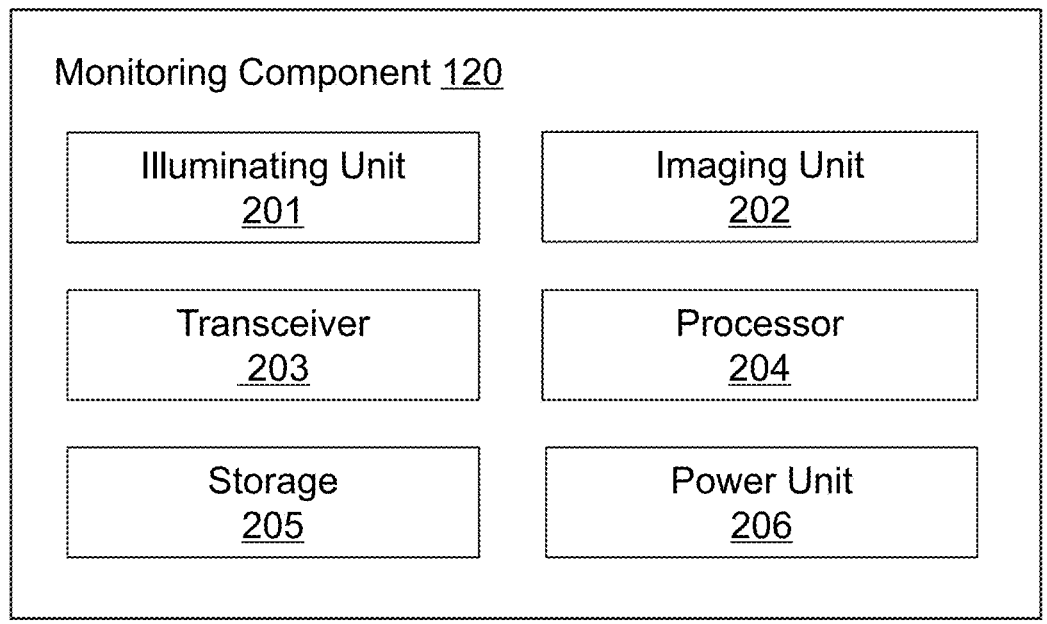
FIG. 2 is a schematic diagram illustrating an exemplary monitoring component according to some embodiments of the present disclosure.

FIG. 2 is a schematic diagram illustrating an exemplary monitoring component 120 according to some embodiments of the present disclosure. The monitoring component 120 may include a lighting unit 201, an imaging unit 202, a transceiver 203, a processor 204, a storage 205, a power unit 206, and a user interface 207. In some embodiments, the lighting unit 201, the imaging unit 202, the transceiver 203, the processor 204, the storage 205, the power unit 206, and the user interface 207 may be connected to and/or communicate with each other via a wireless connection (e.g., a network), a wired connection, or a combination thereof.

The lighting unit 201 may be configured to convert electric to lighting. The lighting unit 201 may include a lighting source, a lighting driver, or the like, or a combination thereof. The lighting source may include a heat radiation light source, a gas discharge light source, a semiconductor light source, etc. The heat radiation light may include incandescent, halogen, etc. The gas discharge light source may include high-intensity discharge lamps, high pressure mercury lamps, metal halide lamps, high pressure sodium lamps, etc. The semiconductor light source may include one or more light emitting diodes (LEDs). According to the chemical nature, the LED may include organic light emitting diode (OLED) and inorganic light emitting diode (LED). According to control mode, the LED may include constant current, constant voltage, etc. According to dimming mode, the LED may include analog dimming, PWM dimming, etc. According to the color, LED may include red LEDs, blue LEDs, green LEDs, yellow LEDs, white LEDs, or a combination thereof, such as RGB. The LED may also include an ordinary monochromatic light-emitting diode, a high-brightness light-emitting diode, an ultra-high brightness light-emitting diode, a color light-emitting diode, a blinking light emitting diode, a voltage-controlled light-emitting diode, an infrared emitting diode, a negative resistance light-emitting diode, etc.

The imaging unit 202 may be configured to acquire image data relating to an AOI. The image data may include a video, an image, or a combination thereof. In some embodiments, the imaging unit 202 may include a video sensors as described elsewhere in the present disclosure (e.g., FIG. 1 and the descriptions thereof). Exemplary video sensors may include a charge coupled device (CCD), a complementary metal-oxide semiconductor (CMOS), etc. In some embodiments, the video sensors may be implemented in a form of a video camera as described elsewhere in the present disclosure.

The transceiver 203 may be configured to transmit and receive data between the different modules, such as the lighting unit 201, the imaging unit 202, the processor 204, the storage 205, the power unit 206, and the user interface. The transceiver 203 may also configured to establish a communication between the control component 130, the processing engine 140, the communication component 150, and the monitoring component 120. The transceiver 203 may establish a communication via a wireless connection, a wired connection, or a combination thereof. In some embodiments, the wireless connection may be based on an industry standard, (e.g., infrared, radio, wireless standards including IEEE 802.11a, 802.11b, 802.11g, 802.11n, 802.15 and so on). In some embodiments, the transceiver 203 may be integrated in any module or unit of the monitoring component 120.

The processor 204 may be configured to process data associated with the lighting unit 201 and/or the imaging unit 202. For example, the processor 204 may detect one or more objects based on images acquired by the imaging unit 201. As another example, the processor 204 may determine one or more lighting parameters based on the detected objects. In some embodiments, the processor 204 may also be configured to control the various units in the monitoring component 120 according to some instructions from the control component 130 or other units, such as the lighting unit 201, the imaging unit 202, the transceiver 203, the storage 205, the power unit 206, and the user interface 207. The processor 204 may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an acorn reduced instruction set computing (RISC) machine (ARM), any other circuit and/or processor capable of executing the functions described herein, or the like, or a combination thereof. The processor 204 may be implemented in numerous ways (e.g., such as with dedicated hardware) to perform various functions. The processor 204 may employ one or more microprocessors that may be programmed using software (e.g., microcode) to perform various functions discussed herein. The processor 204 may be implemented with or without employing a microprocessor, and also may be implemented as a combination of dedicated hardware to perform some functions and a processor (e.g., one or more programmed microprocessors and associated circuitry) to perform other functions. Examples of the processor components that may be employed in various embodiments of the present disclosure include, but are not limited to, conventional microprocessors, application specific integrated circuits (ASICs), and field programmable gate arrays (FPGAs).

The storage 205 may be any data storage that may be loaded with one or more software or instructions, which may be executed by the processor 204. For example, the data may include image data acquired by the imaging unit 202, one or more lighting parameters associated with the lighting unit 201, instructions being implemented by the processor 204 causing the processor 204 to implement a method for lighting control, one or more features of objects being selected via the user interface 207 by a user, or the like, or a combination thereof. The storage 205 may include a hierarchical storage, a network storage, a relational storage, etc., as described elsewhere in the present disclosure (e.g., FIG. 1 and the descriptions thereof.)

The power unit 206 may be configured to provide power for the monitoring component 120. In some embodiments, the power unit 206 may include a base portion for screwing into a light bulb socket. Further the lighting unit 201 and the imaging unit 202 may be powered via a same base portion of the power unit 206. In some embodiments, the power unit 206 may include a battery, e.g., a lithium battery, a lead acid storage battery, a nickel-cadmium battery, a nickel metal hydride battery, or the like, or a combination thereof. In some embodiments, the power unit 206 may be connected with a smart light bulb socket. The smart light bulb socket may be connected with the control component 130 via a wireless and may be also controlled by the control component 130. The control component 130 may power on or off the smart light bulb socket. In some embodiments, the power unit 206 may include an external power source, e.g., a power network with a household power outlet socket or industrial power outlet socket, or the like, or a combination thereof. In some embodiments, the power unit 206 may include one or more charging apparatus. The power unit 206 may provide direct current (DC) power, or alternating current (AC) power. The power unit 206 may further include one or more other internal components, e.g., a converter, a charge/discharge interface, or the like, or a combination thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the monitoring component 120 may also include a reminder module for providing some alarm or indications. It should be noted that the units of the monitoring component 120 may be partially integrated in one or more independent modules or units. In some embodiments, part of the monitoring component 120 may not be necessary, e.g., the storage 205.

Figure 3:
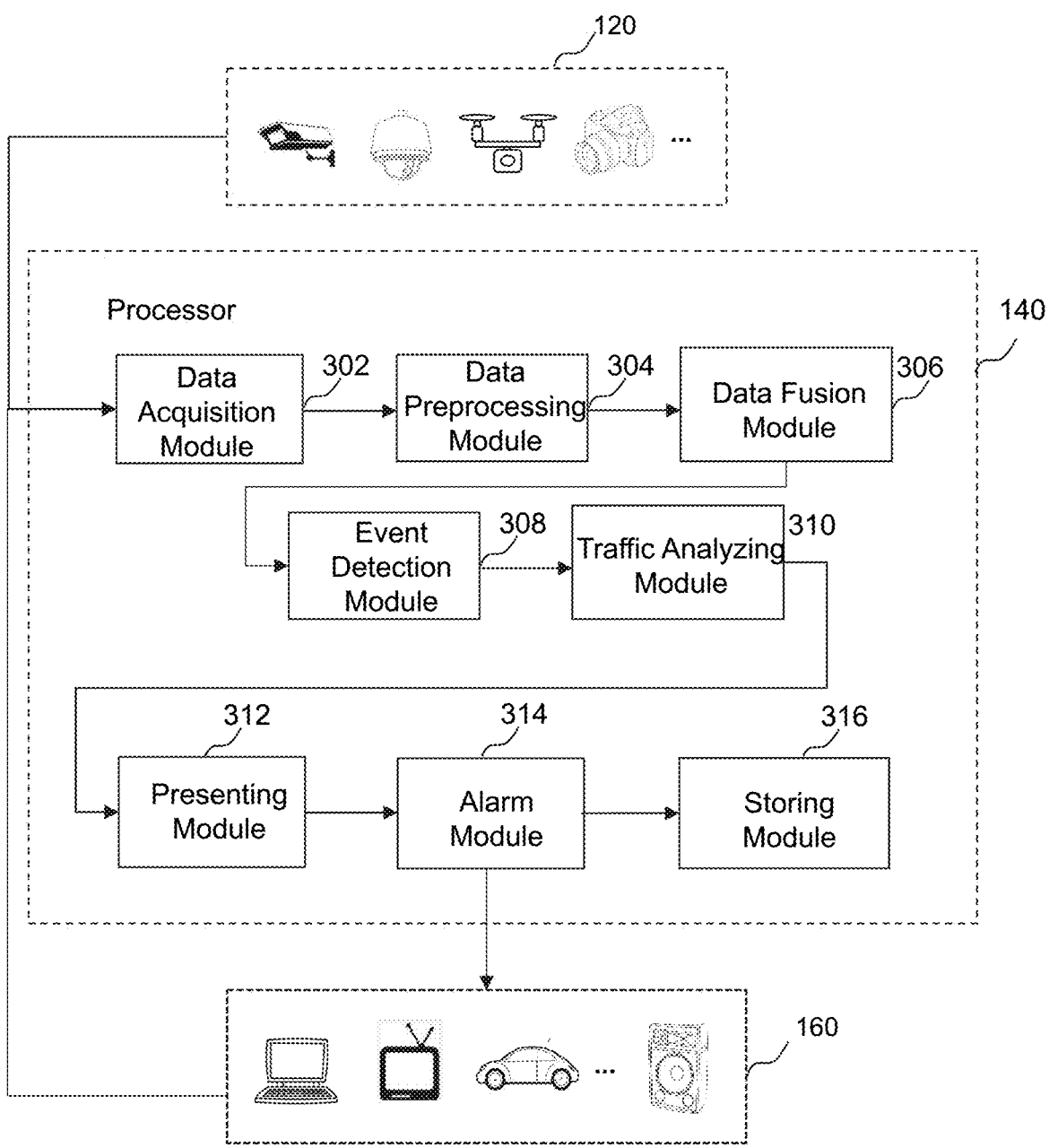
FIG. 3 is a schematic diagram illustrating an exemplary processing engine 140 for processing image data according to some embodiments of the present disclosure.

FIG. 3 is a schematic diagram illustrating an exemplary processing engine 140 for processing image data according to some embodiments of the present disclosure. As shown, the processing engine 140 may include a data acquisition module 302, a data preprocessing module 304, a data fusion module 306, an event module 308, a traffic analyzing module 310, a presenting module 312, an alarm module 314, and a storing module 316. In some embodiments, the data acquisition module 302, the data preprocessing module 304, the data fusion module 306, the event module 308, the presenting module 312, the traffic analyzing module 310, the alarm module 314, and the storing module 316 may be connected to and/or communicate with each other via a wireless connection (e.g., a network), a wired connection, or a combination thereof.

The data acquisition module 302 may acquire images of an area of interest (AOI). The images may include a still picture, a video (offline or live streaming), a frame of a video, or a combination thereof. In some embodiments, the images of an area may be obtained from, for example, a live feed, a storage device, an IEEE 1394-based interface, a video digitizer, a computer graphics engine, a network connection, or the like, or a combination thereof. For example, the data acquisition module 302 may obtain the images of an area from a monitoring component 120. In some embodiments, the images of an area may include a first set of images of the area and a second set of images of the area. Further, the data acquisition module 302 may acquire the first set of images from a plurality of first video sensors (i.e., stationary video sensors) and the second set of images from a plurality of second video sensors (i.e., moving video sensors). In some embodiments, the plurality of first video sensors and/or the plurality of second video sensors may include a video camera. Each of the first video sensors may be coupled with an illuminating device (e.g., a street lamp) as described elsewhere in the present disclosure (e.g., FIGS. 1-2 and the descriptions thereof). Each of the second video sensors may be installed on a motion subject (e.g., a vehicle, a mobile phone, etc.) as described elsewhere in the present disclosure (e.g., FIGS. 1-2 and the descriptions thereof). Data obtained by the data acquisition module 302 may be stored in the storage device 880, sent to the terminal(s) 880 or the server 840 via the network 850.

The AOI may be reflected in the images as a video scene. In some embodiments, the video scene may include one or more objects of interest. The one or more objects of interest may include a person, a vehicle, an animal, a physical subject, or the like, or a combination thereof. One or more actions of the one or more of objects of interest may be reflected in the video scene. In some embodiments, the actions of the one or more objects of interest may include performing a movement, making a sound, making a response, or the like, or a combination thereof.

In some embodiments, the data acquisition module 302 may transfer the images of an AOI to other modules of the processing engine 140 for further processing. For example, the data acquisition module 302 may transfer the images of an AOI to the data preprocessing module 304 for processing the images. As another example, the data acquisition module 302 may transfer the images of an AOI to the data fusion module 306 for generating a map-based surveillance interface. As still an example, the data acquisition module 302 may transfer the images of an AOI to the storing module 316 for store in a local database or a remote database.

The data preprocessing module 304 may preprocess the images of an AOI. In some embodiments, the preprocessing for the images of an AOI may include an enhancement operation, a transform operation, a compress operation, an edge detection, a segmentation operation, a nose reduction operation, or the like, or a combination thereof. For example, the transform operation may be perform to transform the images of an AOI in a domain (e.g., a spatial domain) to another domain (e.g., a frequency domain) for determining a feature of an object in the images of an AOI. As another example, the enhancement operation may be performed to enhance a portion (e.g., a subject portion) of the images of an AOI. As still another example, the segmentation operation may be performed to identify or classify an object in the images of an AOI. In some embodiments, the data preprocessing module 304 may transfer the preprocessed images of an AOI to other modules of the processing engine 140 for further processing. For example, the data preprocessing module 304 may transfer the preprocessed images of an AOI to the data fusion module 306 for generating a map-based surveillance interface of the AOI.

The data fusion module 306 may generate a map-based surveillance interface of the area based on the first set of images. As used herein, the map-based surveillance interface may refer to a calibrated map indicating correspondences between multiple images and locations of a plurality of video sensors (e.g., the stationary video sensors as described elsewhere in the present disclosure) represented on a map. The map may be in form of a satellite image, a blueprint drawing, road network, or the like, or a combination thereof. Exemplary maps may include AUTONAVI Map, GOOGLE Map, BAIDU Map, etc. In some embodiments, the data fusion module 306 may map the image data captured by a plurality of video sensors (e.g., the stationary video sensors as described elsewhere in the present disclosure) to a map. Further, the data fusion module 306 may generate a map-based surveillance interface of the area based on the first set of images and/or the second set of images.

In some embodiments, the data fusion module 306 may identify a target represented in an image captured by a first video sensor. The data fusion module 306 may further identify the target represented in an image captured by one or more second video sensors via fusing the image captured by the first video sensor and the image captured by the one or more second video sensors. The data fusion module 306 may generate a motion track of the target. Further, the data fusion module 306 may determine an object-based surveillance interface based on the identified target and/or the motion track of the target. As used herein, the object-based surveillance interface may refer to a calibrated map indicating correspondences between one or more objects and locations of a plurality of video sensors (e.g., the stationary video sensors as described elsewhere in the present disclosure) represented on a map. In some embodiments, the data fusion module 306 may retrieve one or more features related to the target. The object-based surveillance interface or the map-based surveillance interface may represent the one or more features relating to the target. Exemplary features include a location of the motion object, a velocity of the motion object, a color of the motion object, a contour of the motion object, etc.

In some embodiments, the data fusion module 306 may transfer the map-based surveillance interface to other modules of the processing engine 140 for further processing. For example, the data fusion module 306 may transfer the map-based surveillance interface to the traffic analyzing module 310 for generating a motion pattern of the target associated with the surveillance interface. As another example, the data fusion module 306 may transfer the map-based surveillance interface to the storing module 316 for store. Detailed descriptions regarding the data fusion module 306 may be found elsewhere in the present disclosure (e.g., in connection with FIG. 5).

The event module 308 may detect an event involving one or more targets based on the map-based surveillance interface and/or object-based on surveillance interface. In some embodiments, one or more actions and/or one or more composites of the actions of one or more motion objects may be also referred to as an activity. An event may refer to a fact that one or more objects are engaged in an activity. The event may be defined by a location and/or a time point. In some embodiments, the event relating to the one or more objects may include a normal event and an abnormal event. The normal event may refer to an event performed by the one or more objects that may satisfy a criterion. The abnormal event may refer to an event performed by the one or more objects that may not satisfy a criterion. The criterion may be defined by laws, regulations, conventions, or the like, or a combination thereof. For example, the abnormal event may include over speeding, driving without seat belts, driving without helmet, jaywalking, collision, using mobile phone while driving, etc. The normal event may include driving according to traffic signals, moving on the crosswalk, driving with a silencer, decelerating at intersection, etc. The detected event may be stored in a non-transitory storage medium. The stored event may include information related to the event. Exemplary information relating to the event may include a location where the event happens, a time when the event happens, a type of the event (e.g., an abnormal event), objects involved in the event, a description related to the event, etc.

In some embodiments, the event module 308 may retrieve the information related to an event in response to a determination that an inquiry of the event is received from a terminal device (e.g., the terminal 860). The event module 308 may further retrieve the information related to the event from a non-transitory storage medium (e.g., the storage device 880), and transmit the information related to the event to be displayed on the terminal device (e.g., the terminal 860). The information related to the event may be displayed on the terminal device in at least one of a text, a form, a chart, the map-based surveillance interface, or the object-based surveillance interface. For example, a user may send an inquiry related to violation records of a specific vehicle using a user terminal device. A text related to the violation records of the vehicle may be displayed on the user terminal device after being retrieved from a non-transitory storage medium based on the license plate number of the vehicle. For another example, a user may send an inquiry related to tracks of a vehicle using a user terminal device. A map-based surveillance interface including the vehicle may be displayed on the user terminal device after being retrieved from a non-transitory storage medium.

In some embodiments, the traffic analyzing module 310 may generate a motion pattern of one or more targets based on the motion tracks of the one or more targets in a period of time. As used herein, the motion pattern may refer to a statistic based on the motion tracks of one or more targets in a period of time according to time, space, social behavior, etc. The motion pattern may include a temporal motion pattern, a spatial motion pattern, a social behavioral motion pattern, etc. The temporal motion pattern may refer to a statistic based on the motion tracks of the one or more targets according to time. For example, the temporal motion pattern may include a time statistic for a specific target resting on different locations during a period of time. As another example, the temporal motion pattern may include a time statistic for the one or more targets passing through a specific area or a specific section of a road. The spatial motion pattern may refer to a statistic based on the motion tracks of the one or more targets according to locations. For example, the spatial motion pattern may include a location distribution relating to a specific target resting over a specific times (e.g., 5 times, 10 times, etc.) in a period of time. As another example, the spatial motion pattern may include a route statistic between two locations based on motion tracks of the one or more targets. The social behavioral motion pattern may refer to a statistic based on the motion tracks of the one or more targets according to social behaviors relating to the one or more targets. The social behaviors be defined by one or more events one or more targets involved. The events may include normal events and abnormal events as described elsewhere in the present disclosure. For example, the social behavioral motion pattern may include an overspeeding distribution for a specific target according to time and/or locations. For a further example, the social behavioral motion pattern may indicate one or more locations where and/or when the specific target may over speed based on the motion track of the specific target.

In some embodiments, the traffic analyzing module 310 may activate at least one of the plurality of first video sensors to monitor a target based on a motion pattern associated with the target. For example, the traffic analyzing module 310 may determine a route statistic between two locations based on the motion tracks of the target in a period of time. The traffic analyzing module 310 may activate the at least one of the plurality of first video sensors associated with routes in the route statistic to monitor a vehicle. As another example, the traffic analyzing module 310 may determine a social behavioral motion pattern indicating where and/or when a violation (e.g., over speeding) may be happen. The traffic analyzing module 310 may activate at least one of the plurality of first video sensors associated with the location where the violation (e.g., over speeding) may be happen to monitor a vehicle.

The traffic analyzing module 310 may determine one or more traffic statistics of an area based on image data captured by one or more video sensors. As used herein, the one or more traffic statistics may refer to collection, analysis, interpretation, presentation, organization, etc., of traffic data. The traffic data may be derived from the first set of images. The traffic statistic may include a traffic flow statistic associated with one or more specific locations in a certain time period, a violation statistic associated with one or more specific locations or targets in a certain time period, a route statistic associated with one or more targets or two specific locations, etc. In some embodiments, the traffic analyzing module 310 may analyze the one or more traffic statistics of an area. For example, the traffic analyzing module 310 may determine one or more locations for a specific violation occurring over a specific times (e.g., 100 times, 1000 time, etc.) in a period of time based on the violation statistics. As another example, the traffic analyzing module 310 may determine a violation frequency associated with a specific location based on the one or more traffic statistics of an area. As still an example, the traffic analyzing module 310 may determine a driving preference of a driver based on a route statistic associated with the driver. The driving preference may include a specific route between two locations, a vehicle speed at a section of a road, whether observing a traffic rule, etc.

In some embodiments, the traffic analyzing module 310 may be connected to and/or communicate with other modules of the processing engine 140. For example, the traffic analyzing module 310 may transfer a traffic statistic to the alarm module 314 for generating an alarm signal relating to a violation determined based on the traffic statistic. As another example, the traffic analyzing module 310 may transfer the traffic statistic to the storing module 316 for store in a local database or a remote database.

The presenting module 312 may perform a presentation operation on a display. In some embodiments, the presenting module 312 may present a surveillance interface on a display. For example, the presenting module 312 may present a map-based surveillance interface on a display. As another example, the presenting module 312 may present at least one object-based surveillance interface on a display. As still an example, the presenting module 312 may present the at least one object-based surveillance interface with the map-based surveillance interface simultaneously on the display.

In some embodiments, the presenting module 312 may present a motion track of a target on a surveillance interface. For example, the presenting module 312 may highlight a motion track of the target on the map-based surveillance interface and present the map-based surveillance interface with the highlight motion track on the display. As another example, the presenting module 312 may present the at least one object-based surveillance interface with the motion track of the target on the display. In some embodiments, the presenting module 312 may highlight the motion track of the target on the map-based surveillance interface with a specific color, a specific shape, etc. In some embodiments, the presenting module 312 may present one or more features of the target on the at least one object-based surveillance interface. The one or more features may include at least one of a location of the target, a velocity of the target, a color of the target, a contour of the target, etc.

In some embodiments, the presenting module 312 may present a motion pattern on the display. For example, the presenting module 312 may highlight a location where the target settled at for the longest time in a period on the map-based surveillance interface. The presenting module 312 may further display the map-based surveillance interface with the highlighted location. In some embodiments, the presenting module 312 may present a traffic statistic on the display based on the map-surveillance. For example, the presenting module 312 may present a violation frequency of a location on the map-based surveillance.

The alarm module 314 may generate an alarm signal relating to a violation. The alarm signal relating to a violation may be in a form of sound, text, image, video, or the like, or a combination thereof. In some embodiments, the alarm module 314 may be connected to and/or communicate with one or more terminals 160 to provide the information related to the alarm signal to a user. In some embodiments, the information related to the alarm signal may be displayed on the user interfaces of the one or more terminals 160 in at least one of sound, text, image, video, or a combination thereof. In some embodiments, the information related to the alarm signal may be displayed on the user interfaces of the terminals 160 in one or more view windows, among which, one view window may display a panoramic scene in one resolution and at least one other view window may display a partial scene focused on the at least two motion targets in a different resolution. The terminals 160 may include a mobile device, a tablet computer . . . , a laptop computer, or the like, or a combination thereof. For example, the mobile device may include a mobile phone, a personal digital assistant (PDA), a gaming device, a navigation device, a point of sale (POS) device, a laptop, a tablet computer, or the like, or a combination thereof. In some embodiments, the terminals 160 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 140 via, for example, for further processing. Other types of the input device may include a cursor control device, such as a mouse, a trackball, or cursor direction keys, etc. The output device may include a display, a speaker, a printer, or the like, or a combination thereof. In some embodiments, the alarm module 314 may be connected to and/or communicate with the monitoring component 120. For example, the monitoring component 120 may receive an alarm signal relating to a violation from the alarm module 314. As another example, the monitoring component 120 may generate an intervening signal (e.g., a warning, a shock, etc.) to the at least two motion targets in response to the alarm signal relating to a violation.

The storing module 316 may store data, instructions, and/or any other information relating to a violation based on data relating to a set of images. In some embodiments, the storing module 316 may store data obtained from the processing engine 140, the terminals 160, and/or the monitoring component 120. In some embodiments, the storing module 316 may store data and/or instructions that the processing engine 140 may execute or use to perform exemplary methods described in the present disclosure. In some embodiments, the storing module 316 may include a mass storage, a removable storage, a volatile read-and-write memory, a read-only memory (ROM), or the like, or a combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storing module 316 may be implemented on a cloud platform as described elsewhere in the disclosure. In some embodiments, the storing module 316 may be connected to and/or to communicate with one or more other components in the processing engine 140. One or more components in the processing engine 140 may access the data or instructions stored in the storing module 316.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the monitoring component 120 may include one or more physiological signal measuring devices, such as an oscillometric device, a portable electrocardiograph (ECG) monitor, a portable photoplethysmographic (PPG) monitor, or the like, or a combination thereof. As another example, the features relating to motion objects may further include physiological signal features.

Figure 4:
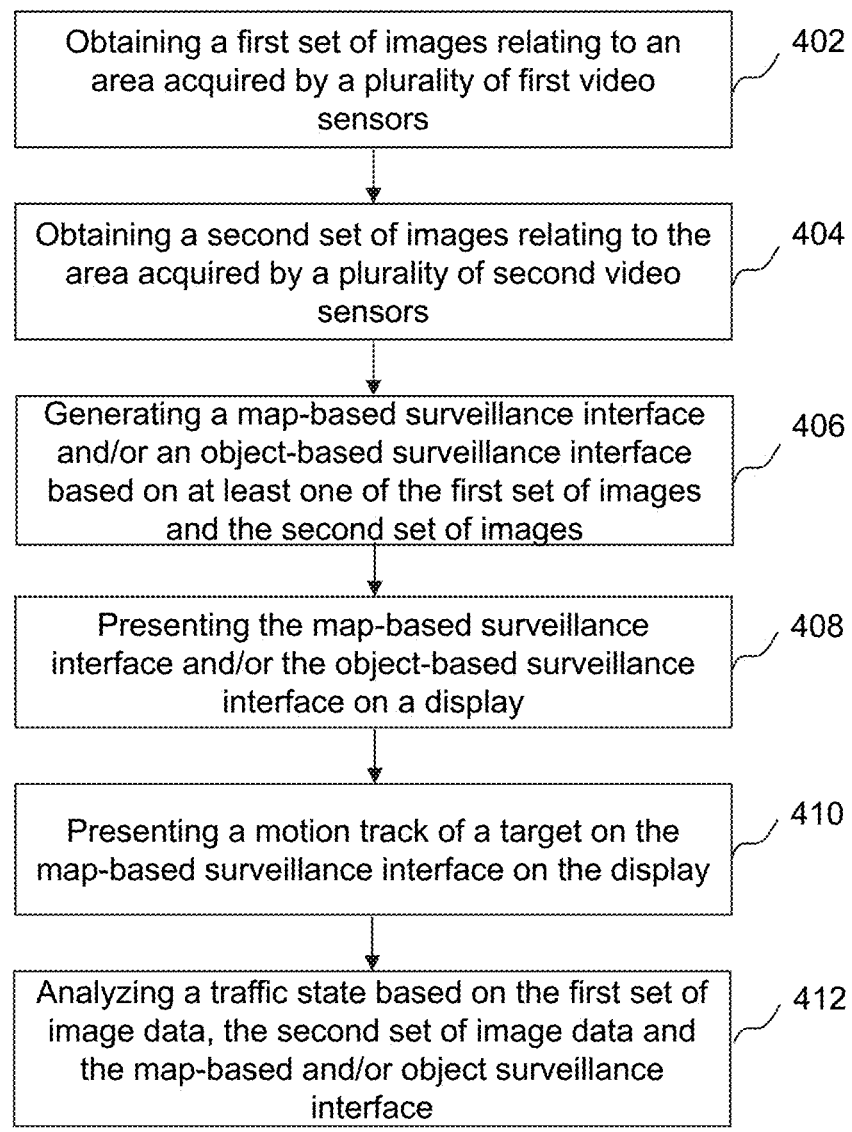
FIG. 4 is a flowchart illustrating an exemplary process for traffic surveillance according to some embodiments of the present disclosure.
Figure 10:
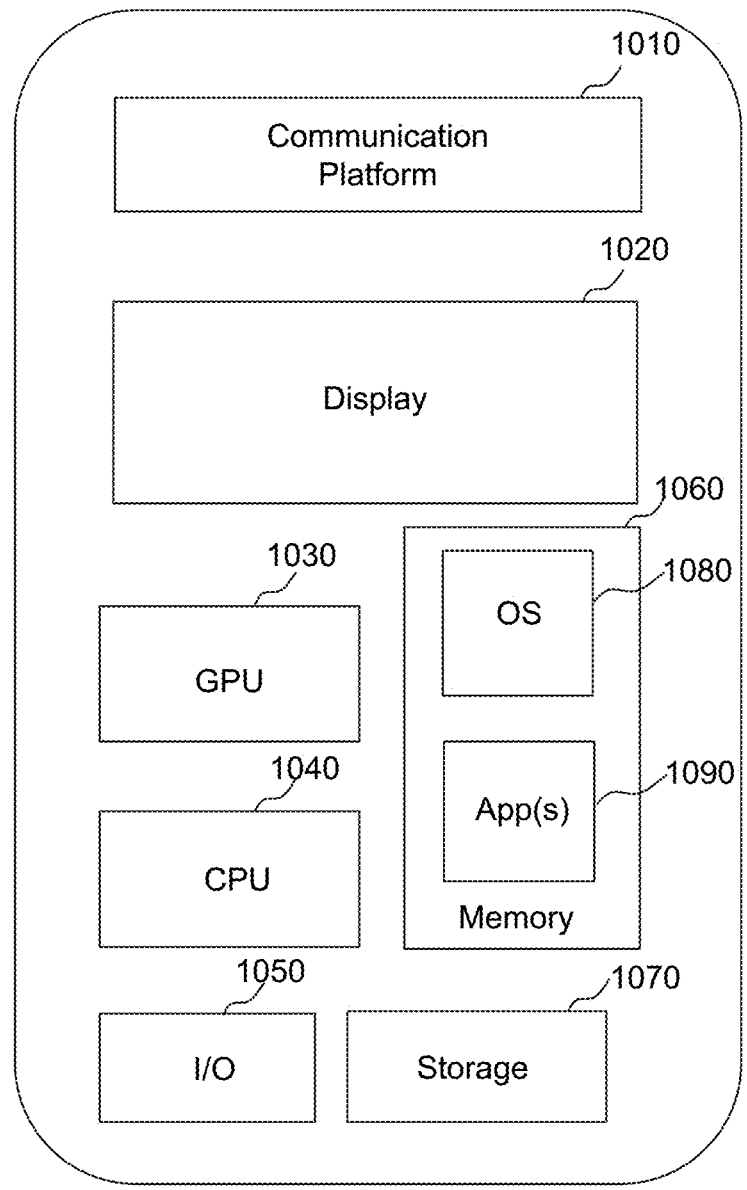
FIG. 10 is a schematic diagram illustrating exemplary hardware and/or software components of an exemplary mobile device on which the terminal(s) may be implemented according to some embodiments of the present disclosure.

FIG. 4 is a flowchart illustrating an exemplary process 400 for traffic surveillance according to some embodiments of the present disclosure. In some embodiments, one or more operations of process 400 illustrated in FIG. 4 may be implemented in the traffic surveillance system 800 illustrated in FIG. 8. For example, the process 400 illustrated in FIG. 4 may be stored in the storage device 880 in the form of instructions, and invoked and/or executed by the processing device 840 (e.g., the processor 910 of the computing device 900 as illustrated in FIG. 9, the GPU 1030 or CPU 1040 of the mobile device 1000 as illustrated in FIG. 10).

In 402, a first set of images relating to an area may be obtained. Operation 402 may be performed by the data acquisition module 302. In some embodiments, the first set of images relating to an area may be described elsewhere in the present disclosure (e.g., FIG. 3 and the descriptions thereof). In some embodiments, the first set of images may be obtained from the monitoring component 820, the storage device 880, the terminals 860, or any other external storage device. In some embodiments, the first set of images relating to an area may be obtained from, for example, a live feed, a storage device, an IEEE 1394-based interface, a video digitizer, a computer graphics engine, a network connection, or the like, or a combination thereof. Further, the data acquisition module 302 may acquire the first set of images from a plurality of first video sensors (i.e., stationary video sensors) and the second set of images from a plurality of second video sensors (i.e., moving video sensors). Detailed descriptions regarding the plurality of first video sensors and the plurality of second video sensors may be found elsewhere in the present disclosure (e.g., in connection with FIG. 3).

In 404, a second set of images relating to the area may be obtained. Operation 404 may be performed by the data acquisition module 302. In some embodiments, the second set of images relating to an area may be described elsewhere in the present disclosure (e.g., FIG. 3 and the descriptions thereof). In some embodiments, the second set of images may be obtained from the monitoring component 820, the storage device 880, the terminals 860, or any other external storage device. In some embodiments, the second set of images may be acquired by a plurality of second video sensors. Each of the second video sensors may be installed on a motion subject (e.g., a vehicle, a mobile phone, etc.) as described elsewhere in the present disclosure (e.g., FIGS. 1-2 and the descriptions thereof).a combination thereof.

In 406, a map-based surveillance interface and/or an object-based surveillance interface may be generated based on at least one of the first set of images and the second set of images. Operation 406 may performed by the data fusion module 306. More descriptions for generating the map-based surveillance may be found in in connection with FIG. 6.

In 408, the map-based surveillance interface and/or the object-based surveillance interface may be presented on a display. Operation 408 may be performed by the presenting module 312. As used herein, a display may refer to a screen of a display device. The display device may include a liquid crystal display (LCD), a light-emitting diode (LED)-based display, a flat panel display, a curved screen, a television device, a cathode ray tube (CRT), a touch screen, or the like, or a combination thereof.

In some embodiments, the presenting module 312 may present a surveillance interface on a display. For example, the presenting module 312 may present a map-based surveillance interface on a display. As another example, the presenting module 312 may present at least one object-based surveillance interface on a display. As still an example, the presenting module 312 may present the at least one object-based surveillance interface with the map-based surveillance interface simultaneously on the display.

In 410, a motion track of a target may be presented on the map-based surveillance interface. Operation 410 may be performed by the presenting module 312. For example, the presenting module 312 may highlight a motion track of the target on the map-based surveillance interface and present the map-based surveillance interface with the highlight motion track on the display. As another example, the presenting module 312 may present the at least one object-based surveillance interface with the motion track of the target on the display. In some embodiments, the presenting module 312 may highlight the motion track of the target on the map-based surveillance interface with a specific color, a specific shape, etc. In some embodiments, the presenting module 312 may present one or more features of the target on the at least one object-based surveillance interface. The one or more features may include at least one of a location of the target, a velocity of the target, a color of the target, a contour of the target, etc.

In some embodiments, the presenting module 312 may present a motion pattern on the display. In some embodiments, the presenting module 312 may present a traffic statistic on the display based on the map-surveillance. Detailed descriptions regarding the motion pattern and the traffic statistic may be found elsewhere in the present disclosure (e.g., in connection with FIG. 3).

In 412, a traffic state may be analyzed based on the first set of images, the second set of images and the map-based and/or object surveillance interface. Operation 412 may be performed by the traffic analyzing module 310. The traffic state may be analyzed based on one or more traffic statistics and/or traffic rules related to the area. As used herein, the one or more traffic statistics may refer to collection, analysis, interpretation, presentation, organization, etc., of traffic data. The traffic data may be derived from the first set of images. The traffic statistic may include a traffic flow statistic associated with one or more specific locations in a certain time period, a violation statistic associated with one or more specific locations or targets in a certain time period, a route statistic associated with one or more targets or two specific locations, etc.

As used herein, a traffic state may refer to a judgment on a traffic behavior. A traffic state related to a vehicle may include a collision, an over-speeding, a parking violation, a violation of yellow line, a violation of stop line, a driving against traffic signals, an over taking from wrong side, or the like, or a combination thereof. A traffic state related to a road user may include driving without seat belts, driving without helmet, moving against traffic signals, a hit-and-run, or the like, or a combination thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, operation 410 may be divided into multiple operations. Operation 410 may include presenting one or more features on the map-based surveillance interface. Operation 410 may further include activating at least one of the plurality of first video sensors to monitor the target based on the motion pattern. As another example, operation 412 may be integrated into operation 410. As still an example, process 400 may further include storing intermediate data (e.g., the features, the motion patterns, the traffic state, etc.) generated during operations 402-412.

Figure 5:
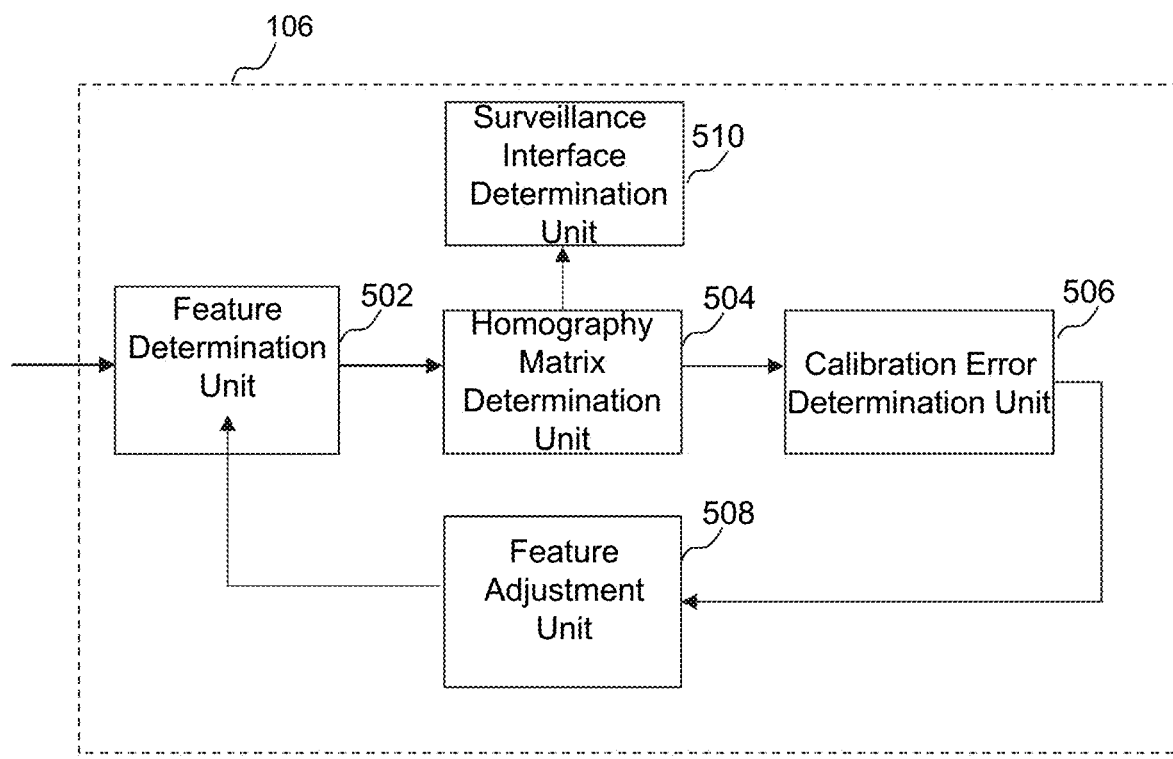
FIG. 5 is a schematic diagram illustrating an exemplary data fusion module for processing video data according to some embodiments of the present disclosure.

FIG. 5 is a schematic diagram illustrating an exemplary data fusion module 306 according to some embodiments of the present disclosure. As shown, the data fusion module 306 may include a feature determination unit 502, a homography matrix determination unit 504, a calibration error determination unit 506, a feature adjustment unit 508, and a surveillance interface determination unit 510. In some embodiments, the feature determination unit 502, the homography matrix determination unit 504, the calibration error determination unit 506, the feature adjustment unit 508, and the surveillance interface determination unit 510 may be connected to and/or communicate with each other via a wireless connection (e.g., a network), a wired connection, or a combination thereof.

The feature determination unit 502 may determine a plurality features represented in image data acquired by video sensors and corresponding features represented in a map. For example, the feature determination unit 502 may identify the one or more features in the set of images using one or more feature descriptor. Exemplary feature descriptors may include a scale invariant feature transform (SIFT), a speeded up robust feature (SURF), a multi-support region order-based gradient histogram (MROGH), a binary robust independent element feature (BRIEF), an affine SIFT, or the like, or a combination thereof.

As used herein, a feature represented in image data acquired by a video sensor (e.g., a camera) may be also referred to as a view feature. A corresponding feature represented in a map may be also referred as a map feature. Two corresponding view feature and map feature may be also referred to as matching features between image data and a map. The matching features may be associated with the same property of a target visible in the image data. Exemplary properties of a target may include a bounding box, a centroid, a footprint, a shape, a length, a height, a width, a color, a velocity, a classification, or the like, or a combination thereof. The image data may include multiple image sequences (also referred to as image frames), a video, video meta-data, etc. A map may be a satellite image, a blueprint drawing, road network, or the like, or a combination thereof.

The plurality of features may include a plurality of point features, a plurality of line features, or the like, or a combination thereof. As used herein, the point feature may include coordinates of a point associated with a target. The line feature may include a length of a target, a width of a target, a height of a target, etc. The plurality of features may be determined based on at least one of the properties relating to the targets visible in the image data. For example, a point feature associated with a target may be determined based on the centroid of the target. As another example, a line feature associated with a target may be determined based on a height of the target (e.g., a height of a street lamp).

In some embodiments, the feature determination unit 502 may determine one or more features according to an instruction inputted by a user. For example, the user may manually select a target visible in the image data via the terminal 860 (e.g., a mouse). The feature determination unit 502 may determine a view feature and a map feature associated with the selected target.

In some embodiments, the feature determination unit 502 may determine one or more features according to default settings of the traffic surveillance system 800. For example, a target visible in the image data may be default settings of the traffic surveillance system 800. Further, the target may include a street lamp, a lane mark, at least one portion of a vehicle (e.g., a license plate), a pedestrian, etc. The feature determination unit 502 may identify the target visible in the image data. Further, the feature determination unit 502 may determine a view feature and a map feature associated with the determined target. In some embodiments, the feature determination unit 502 may automatically detect one or more targets in the image data and determine one or more view features based on the detected targets. The feature determination unit 502 may further determine the corresponding map features.

In some embodiments, the feature determination unit 502 may be connected to and/or communicate with other components of the data fusion module 306. For example, the feature determination unit 502 may transfer the plurality of point features and the line features to the homography matrix determination unit 504 for estimating a homography matrix. As another example, the feature determination unit 502 may transfer the line features to the feature adjustment unit 508 for adjusting point features.

The homography matrix determination unit 504 may estimate a homography matrix based on the plurality of features determined by the feature determination unit 502. As used herein, a homography matrix may be configured to convert a view feature to a map feature. In some embodiments, the homography matrix determination unit 504 may estimate the homography matrix based on a plurality of matching features. For example, the homography matrix determination unit 504 may estimate a homography matrix using the Direct Linear Transformation algorithm based on the plurality of matching features. The Direct Linear Transformation algorithm may include a plurality of iterations. In each of the plurality iterations, an estimated homography matrix may be generated based on at least one of the plurality of matching features. For a further example, the homography matrix determination unit 504 may determine an intermediate matrix A based on at least one portion of the plurality of matching features, wherein Ah=0, and h being a vector form of an estimated homography matrix. The homography matrix determination unit 504 may estimate a target homography matrix based on an eigenvector of the smallest eigenvalue of A'A.

In some embodiments, the homography matrix determination unit 504 may be connected to and/or communicate with other components of the data fusion module 306. For example, the homography matrix determination unit 504 may transfer the estimated homography matrix to the calibration error determination unit 506 for determining a calibration error. As another example, the homography matrix determination unit 504 may transfer the estimated homography matrix to the surveillance interface determination unit 510 for generating a map-based surveillance interface.

The calibration error determination unit 506 may determine a calibration error between an estimated map feature determined based on an estimated homography matrix and a reference map feature. A reference map feature may correspond to an actual feature associated with a target represented on a map. As used herein, the calibration error may be defined by a distance on the map between one of the estimated map features transformed from a corresponding view feature based on an estimated homography matrix and a corresponding reference map feature.

In some embodiments, the calibration error determination unit 506 may generate the one or more estimated map features transformed from the one or more view features using the homography matrix estimated by the homography matrix determination unit 504. In some embodiments, the calibration error determination unit 506 may further match the one or more estimated map features with the one or more reference map features, respectively. The calibration error determination unit 506 may further determine multiple distances between each of the one or more estimated map features and a corresponding reference map feature. The calibration error determination unit 506 may also determine the calibration error based on the multiple distances. For example, the calibration error determination unit 506 may designate an average distance of the multiple distances as the calibration error. As another example, the calibration error determination unit 506 may designate one of the multiple distances as the calibration error, such as a maximum distance, a minimum distance, etc.

In some embodiments, the calibration error determination unit 506 may determine whether the calibration error is smaller than a calibration threshold. .The calibration threshold may be set by a user or according to default settings of the traffic surveillance system 800.

In some embodiments, the calibration error determination unit 506 may be connected to and/or communicate with other components of the data fusion module 306. For example, the calibration error determination unit 506 may transfer a determination that the calibration error exceeds or equals to the calibration threshold to the feature adjustment unit 508. As another example, the calibration error determination unit 506 may transfer a homography matrix to the surveillance interface determination unit 510 for generating a surveillance interface, in response to a determination that the calibration error is smaller than the calibration threshold.

The feature adjustment unit 508 may adjust at least one portion of the plurality of matching features. In some embodiments, the matching features may be adjusted until the calibration error is smaller than the calibration threshold.

In some embodiments, the feature adjustment unit 508 may adjust at least one portion of the plurality of matching features via adjusting one or more control points on a map. Further, the feature adjustment unit 508 may determine one or more control points on the map based on map features. For example, the feature adjustment unit 508 may designate the one or more map point features as the control points. In some embodiments, the feature adjustment unit 508 may estimate the control points based on the line map features. For example, the feature adjustment unit 508 may determine an intersection of two lines on a map as a control point. In some embodiments, the feature adjustment unit 508 may adjust a control point based on map line features associated the control point. For example, the feature adjustment unit 508 may determine an intersection of two lines on the map as an initial control point. Then the feature adjustment unit 508 may adjust the end points of the two lines on the map via adding a standard deviation (e.g., 0.5). A distance between the initial control point and the adjusted intersection of the two adjusted lines on the map may be determined. The adjusted intersection may be designated as the adjusted control point if the distance is less than a threshold. . In some embodiments, the feature adjustment unit 508 may adjust at least one portion of the plurality of control points by adding new control points. For example, the feature adjustment unit 508 may determine end points of a map line feature as new control points. For another example, the feature adjustment unit 508 may determine projection points of the end points as new control points. In some embodiments, the feature adjustment unit 508 may be connected to and/or communicate with other components of the data fusion module 306. For example, the feature adjustment unit 508 may transmitted the adjusted control points to the homography matrix determination unit 504 for estimating a new homography matrix.

The surveillance interface determination unit 510 may establish a map-based surveillance interface. In some embodiments, the surveillance interface may be established by transforming the image data acquired by different video sensors to a map based on a target homography matrix determined by the homography matrix determination unit 504. The map-based surveillance interface may include a plurality of targets. The targets may include a motion target and an immobile target. Exemplary motion targets may include vehicles, pedestrian, animals, etc. Exemplary immobile targets may include plants, buildings, etc. The map-based surveillance interface may represent one or more features associated with targets. Exemplary features associated with targets may include shape, color, movement track, velocity, location, etc.

In some embodiments, the surveillance interface determination unit 510 may determine an object-surveillance interface. The object-surveillance interface may represent a specific object on the map. For example, the object-surveillance interface may represent a motion track of a vehicle. In some embodiments, the surveillance interface determination unit 510 may determine an object-surveillance interface associated with a specific object via fusing image data captured by multiple video sensors to determine the specific object and transform the fused image data to a map based on the target homography matrix. In some embodiments, the surveillance interface determination unit 510 may determine an object-surveillance interface associated with a specific object via fusing the specific object captured by multiple video sensors on the map-based surveillance interface.

The surveillance interface determination unit 510 may further detect if any new view target has become stable, meaning that it has a consistent appearance and is tracked with high confidence. In response to a determination that a new view target becomes stable, the surveillance interface determination unit 510 may compare the stabled new view target with all the existing map targets to see if there is a good match. If the new view target matches an existing map target, the surveillance interface determination unit 510 may merge the stabled new target into the matched map target and update the matched map target. Otherwise, the surveillance interface determination unit 510 may produce a new map target based on the stabled new view target.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the feature adjustment unit 508 and the calibration error determination unit 506 may be integrated into one single unit. As another example, the feature determination unit 502 and the feature adjustment unit 508 may be integrated into one single unit. As still an example, the calibration error determination unit 506 may be omitted.

Figure 6:
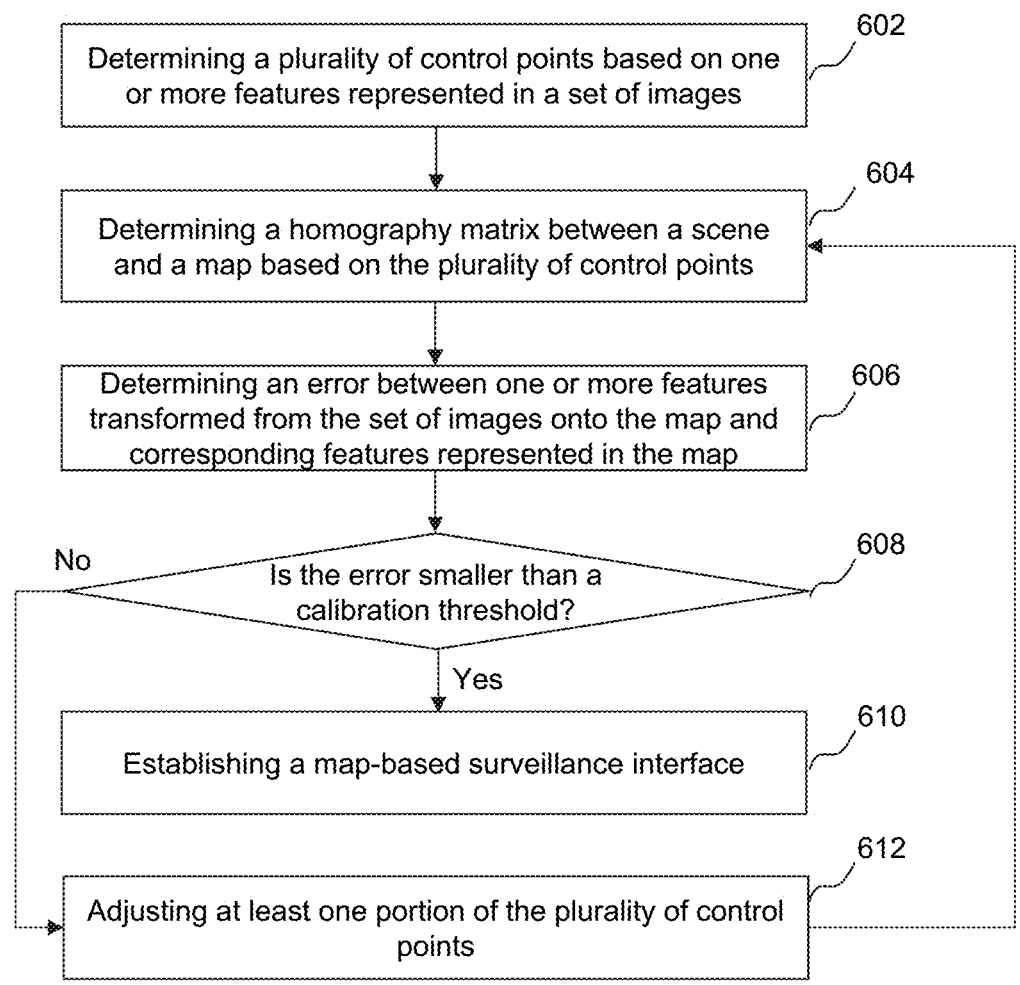
FIG. 6 is a flowchart illustrating an exemplary process for establishing a map-based surveillance interface according to some embodiments of the present disclosure.

FIG. 6 is a flowchart illustrating an exemplary process 600 for establishing a map-based surveillance interface according to some embodiments of the present disclosure. In some embodiments, one or more operations of process 600 illustrated in FIG. 6 may be implemented in the traffic surveillance system 800 illustrated in FIG. 8. For example, the process 600 illustrated in FIG. 6 may be stored in the storage 880 in the form of instructions, and invoked and/or executed by the processing device 840 (e.g., the processor 910 of the computing device 900 as illustrated in FIG. 9, the GPU 1030 or CPU 1040 of the mobile device 1000 as illustrated in FIG. 10).

In 602, a plurality of control points may be determined based on one or more features represented in a set of images. Operation 602 may be performed by the feature determination unit 502. As described in connection with FIG. 5, the plurality of control points may be default settings of the traffic surveillance system 800, or may be designated by users of the surveillance system 800. The plurality of control points may provide unambiguous matching pairs between a map and image data acquired by a video sensor (e.g., a camera).

In some embodiments, the plurality of control points in image data of different image sequences may be identified by matching line features in conjunction with point features. Similar to the plurality of control points, the line features may be default settings of the traffic surveillance system 800, or may be designated by users of the surveillance system 800. In some embodiments, the line features may be computed from pairs of system defined/user designated control points.

In 604, a homography matrix between a view and a map may be determined based on the plurality of control points. Operation 604 may be performed by the homography matrix determination unit 504. As used herein, a homography matrix may be configured to convert a view feature to a map feature. For example, the homography matrix may be configured to convert a point b in the view to a corresponding point B in the map, the point b and point B being a matching pair of control points. In some embodiments, the converting relationship between the point b in the view and the corresponding point B in the map may be expressed as:

$$B=Hb \quad (1),$$

where H denotes a 3*3 homography matrix, B denotes a homogeneous coordinate of a point (X,Y,1) in the map, and b denotes a homogeneous coordinate of a corresponding point (x,y,1) in the view.

H may be computed from a set of map-view correspondence points (e.g., control points). From Equation 1, each pair of correspondence points may provide two equations. Given the 8 unknowns in H, at least 4 point pairs are needed. Writing H in vector form as h=(h11, h12, h13, h21, h22, h23, h31, h32, h33), Equation 1 for n points becomes Ah=0, where A may be expressed as:

$$A = \begin{bmatrix} x_1 & y_1 & 1 & 0 & 0 & 0 & -x_1X_1 & -y_1X_1 & -X_1 \\ 0 & 0 & 0 & x_1 & y_1 & 1 & -x_1Y_1 & -y_1Y_1 & -Y_1 \\ x_2 & y_2 & 1 & 0 & 0 & 0 & -x_2X_2 & -y_2X_2 & -X_2 \\ 0 & 0 & 0 & x_2 & y_2 & 1 & -x_2Y_2 & -y_2Y_2 & -Y_2 \\ \vdots & \vdots & \vdots & \vdots & \vdots & \vdots & \vdots & \vdots & \vdots \\ x_n & y_n & 1 & 0 & 0 & 0 & -x_nX_n & -y_nX_n & -X_n \\ 0 & 0 & 0 & x_n & y_n & 1 & -x_nY_n & -y_nY_n & -Y_n \end{bmatrix}, \quad (2)$$

where Xi, Yi denotes homogeneous coordinates of a map point i, and xi, yi denotes homogeneous coordinates of a corresponding scene point i, and n denotes the number of pairs of correspondence points.

The homography matrix may be obtained when |Ah| reaches a minimum value. In some embodiments, the minimum value may be determined based on an eigenvector of the smallest eigenvalue of A'A, which may be obtained from singular value decomposition (SVD) of A.

In 606, a calibration error between an estimated map feature determined based on an estimated homography matrix and a reference map feature may be determined. Operation 606 may be performed by the calibration error determination unit 506. A reference map feature may correspond to an actual feature associated with a target represented on a map. In some embodiments, the one or more estimated map features may be matched with the one or more reference map features, respectively, before determining the calibration error. As used herein, the calibration error may be defined by a distance on the map between one of the estimated map features transformed from a corresponding view feature based on an estimated homography matrix and a corresponding reference map feature. Take a line feature as an example, the distance between an estimated map line feature (e.g., L2 in FIG. 7) and a corresponding reference map line feature (e.g., L1 in FIG. 7) is the enclosed area (e.g., shaded area in FIG. 7) between two line segments representing the two line features on the map.

In 608, a determination may be made to as whether the calibration error is smaller than a calibration threshold. Operation 608 may be performed by the calibration error determination unit 506. If it is determined that the error is smaller than the calibration threshold, process 600 may proceed to perform operation 610. If it is determined that the error is smaller than the calibration threshold, process 600 may proceed to perform operation 612. In some embodiments, the calibration threshold may be default settings of the traffic surveillance system 800, or may be adjustable under different situations.

In 610, a map-based surveillance interface may be established. Operation 610 may be performed by the surveillance interface determination unit 510. In some embodiments, the surveillance interface may be established by transforming the image data acquired by different video sensors to a map based on a target homography matrix determined by the homography matrix determination unit 504. The map-based surveillance interface may include a plurality of targets. The targets may include a motion target and an immobile target.

In 612, at least one portion of the plurality of control points may be adjusted. Operation 612 may be performed by the feature adjustment unit 508. In some embodiments, a control point may be adjusted based on map line features associated with the control point. For example, an intersection of two lines on the map may be determined as an initial control point. Then the end points of the two lines on the map may be adjusted via adding a standard deviation (e.g., 0.5). In some embodiments, at least one portion of the plurality of control points may be adjusted by adding new control points. For example, end points of a map line feature may be added as new control points. The descriptions of an exemplary process for adjusting at least one portion of the plurality of control points may be found elsewhere in present disclosure (e.g., control points p1, p2, P1, P2 illustrated in FIG. 7, and the descriptions thereof).

Figure 7:
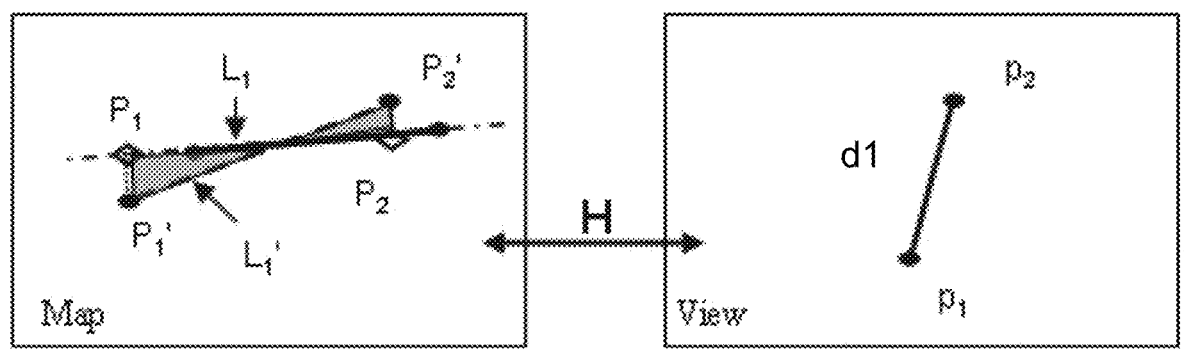
FIG. 7 is a schematic diagram illustrating an exemplary process for adjusting at least one portion of the plurality of control points according to some embodiments of the present disclosure

FIG. 7 is a schematic diagram illustrating an exemplary process for adjusting at least one portion of the plurality of control points according to some embodiments of the present disclosure.

As illustrated in FIG. 7, d1 and L1 may be a pair of matching line segments. Line segment l1 denotes a view line feature. Line segment L1 denotes a map line feature. . The line segment d1 may be transformed into a line segment L1' with points P1' and P2' as ending points based on an estimated homography matrix H. The points P1 and P2 may be the projection points of the points P1' and P2' respectively. The projection point P1 and P2 may added to be the control points when the estimate homography matrix H minimizes the distance between L1'and the line segment L1 on the map. The minimization may be obtained by minimizing the shaded area between L1 and L1' by projecting the points P1' and P2' onto line L1. Point pairs (p1, P1) and (p2, P2), being matching pairs of points, may become control points for the next iteration.

Referring back to FIG. 6, in 612, in subsequent iterations, additional control points as point pairs (p1, P1) and (p2, P2) may be further adjusted by projecting them on the line L1 based on the newly estimated homography H, as long as these adjustments further improve the calibration accuracy.

Figure 8:
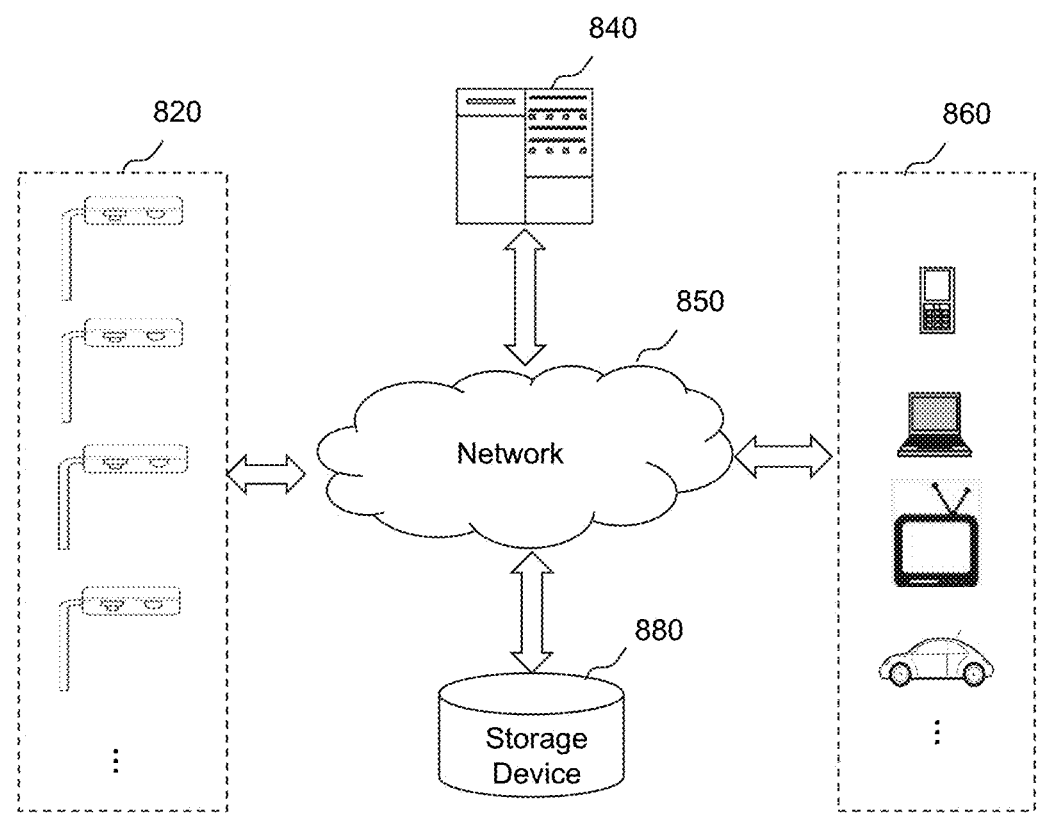
FIG. 8 is a schematic diagram illustrating an exemplary traffic surveillance system according to some embodiments of the present disclosure.

FIG. 8 is a schematic diagram illustrating an exemplary traffic surveillance system 800 according to some embodiments of the present disclosure. As shown, the traffic surveillance system 800 may include a monitoring component 820, a processing engine 840, storage 880, one or more terminal(s) 860, and a network 850. In some embodiments, the monitoring component 820, the processing engine 840, the storage 880, and/or the terminal(s) 860 may be connected to and/or communicate with each other via a wireless connection (e.g., the network 850), a wired connection, or a combination thereof. The connection between the components in the traffic surveillance system 800 may be variable. Merely by way of example, the monitoring component 820 may be connected to the processing engine 840 through the network 850, as illustrated in FIG. 8. As another example, the monitoring component 820 may be connected to the processing engine 840 directly. As a further example, the storage 880 may be connected to the processing engine 840 through the network 850, as illustrated in FIG. 8, or connected to the processing engine 840 directly. As still a further example, the terminal(s) 860 may be connected to the processing engine 840 through the network 850, as illustrated in FIG. 8, or connected to the processing engine 840 directly.

The monitoring component 820 may be positioned to perform surveillance of an area of interest (AOI) or an object of interest. In some embodiments, the AOI may be indoor or outdoor. For example, the AOI may include a room, a room in a jail, a shopping mall, a street, a park, a subway station, etc. The object may be organism or non-organism. For example, the object may include a person, a vehicle, an animal, a physical object, or the like, or a combination thereof.

In some embodiments, the monitoring component 820 may include a video camera, a physiological signal measuring device, a wearable smart device, or the like, or a combination thereof. As used herein, a video camera may refer to an apparatus for visual recording. For example, the video camera may include a color camera, a digital video camera, a camera, a camcorder, a PC camera, a webcam, an infrared(IR) video camera, a low-light video camera, a thermal video camera, a CCTV camera, a pan, a tilt, a zoom (PTZ) camera, a video sensing device, or the like, or a combination thereof. The monitoring component 820 may include one or more video cameras that are installed in various places to monitor an area of interest. In some embodiments, the monitoring component 820 may include a camera embedded unmanned aerial vehicle (UAV). The physiological signal measuring device be configured to acquire a physiological signal of the object of interest. The physiological signal may include a photoplethysmogram (PPG) signal, an electrocardiogram (ECG) signal, an electroencephalogram (EEG) signal, an electromyogram (EMG) signal, or the like, or a combination thereof. The physiological signal measuring device may include an oscillometric device, a portable ECG monitor, a portable PPG monitor, or the like, or a combination thereof. The wearable smart device wearable devices include a pair of glasses, a shoulder strap, a smart watch, an anklet, a thigh band, an armband, a chest belt, a necklet, a finger clip, or the like, or a combination thereof. The above mentioned examples of monitoring component 820 are provided for illustration purposes, and not intended to limit the scope of the present disclosure. The monitoring component 820 may be in another form including, for example, a fingerstall, a wristband, a brassiere, an underwear, a chest band, or the like, or a combination thereof.

The processing engine 840 may process data and/or information obtained from the monitoring component 820, the storage 880, and/or the terminal(s) 860. For example, the processing engine 840 may generate a surveillance interface based on data collected by the monitoring component 820. In some embodiments, the processing engine 840 may be a single server or a server group. The server group may be centralized or distributed. In some embodiments, the processing engine 840 may be local or remote. For example, the processing engine 840 may access information and/or data from the monitoring component 120, the storage 880, and/or the terminal(s) 860 via the network 850. As another example, the processing engine 840 may be directly connected to the monitoring component 120, the terminal(s) 860, and/or the storage 880 to access information and/or data. In some embodiments, the processing engine 840 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing engine 840 may be implemented by a computing device 900 having one or more components as described in connection with FIG. 9.

The storage 880 may store data, instructions, and/or any other information. In some embodiments, the storage 880 may store data obtained from the processing engine 840, and the terminal(s) 860. In some embodiments, the storage 880 may store data and/or instructions that the processing engine 840 may execute or use to perform exemplary methods described in the present disclosure. In some embodiments, the storage 880 may include a mass storage, a removable storage, a volatile read-and-write memory, a read-only memory (ROM), or the like, or a combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 880 may be implemented on a cloud platform as described elsewhere in the disclosure.

In some embodiments, the storage 880 may be connected to the network 850 to communicate with one or more other components in the traffic surveillance system 800 (e.g., the processing engine 840, the terminal(s) 860, etc.). One or more components in the traffic surveillance system 800 may access the data or instructions stored in the storage 880 via the network 850. In some embodiments, the storage 880 may be part of the processing engine 840.

The terminal(s) 860 may be connected to and/or communicate with the monitoring component 820, the processing engine 840, and/or the storage 880. For example, the terminal(s) 860 may obtain a surveillance interface from the processing engine 840. As another example, the terminal(s) 860 may obtain image data acquired via the monitoring component 820 and transmit the image data to the processing engine 840 to be processed. In some embodiments, the terminal(s) 860 may include a mobile device, a tablet computer, a laptop computer, or the like, or a combination thereof. For example, the mobile device may include a mobile phone, a personal digital assistance (PDA), a gaming device, a navigation device, a point of sale (POS) device, a laptop, a tablet computer, a desktop, or the like, or a combination thereof. In some embodiments, the terminal(s) 860 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 840 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 860 may be part of the processing engine 840.

The network 850 may include any suitable network that can facilitate exchange of information and/or data for the traffic surveillance system 800. In some embodiments, one or more components of the traffic surveillance system 800 (e.g., the monitoring component 820, the processing engine 840, the storage 880, the terminal(s) 860, etc.) may communicate information and/or data with one or more other components of the traffic surveillance system 800 via the network 850. For example, the processing engine 840 may obtain image data from the monitoring component 120 via the network 850. As another example, the processing engine 840 may obtain user instruction(s) from the terminal(s) 860 via the network 850. The network 850 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or a combination thereof. For example, the network 850 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or a combination thereof. In some embodiments, the network 850 may include one or more network access points. For example, the network 850 may include wired and/or wireless network access points such as base stations and/or internet exchange points through which one or more components of the traffic surveillance system 800 may be connected to the network 850 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage 880 may be a data storage including cloud computing platforms, such as, public cloud, private cloud, community, and hybrid clouds, etc. However, those variations and modifications do not depart the scope of the present disclosure.

FIG. 9 is a schematic diagram illustrating exemplary hardware and/or software components of an exemplary computing device 900 on which the processing engine 840 may be implemented according to some embodiments of the present disclosure. As illustrated in FIG. 9, the computing device 900 may include a processor 910, a storage 920, an input/output (I/O) 930, and a communication port 940.

The processor 910 may execute computer instructions (e.g., program code) and perform functions of the processing engine 840 in accordance with techniques described herein. The computer instructions may include, for example, routines, programs, objects, components, data structures, procedures, modules, and functions, which perform particular functions described herein. For example, the processor 910 may process image data obtained from the monitoring component 820, the storage 880, terminal(s) 860, and/or any other component of the traffic surveillance system 800. In some embodiments, the processor 910 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the computing device 900. However, it should be noted that the computing device 900 in the present disclosure may also include multiple processors, thus operations and/or method steps that are performed by one processor as described in the present disclosure may also be jointly or separately performed by the multiple processors. For example, if in the present disclosure the processor of the computing device 900 executes both operation A and operation B, it should be understood that operation A and operation B may also be performed by two or more different processors jointly or separately in the computing device 900 (e.g., a first processor executes operation A and a second processor executes operation B, or the first and second processors jointly execute operations A and B).

The storage 920 may store data/information obtained from the monitoring component 820, the storage 880, the terminal(s) 860, and/or any other component of the traffic surveillance system 800. In some embodiments, the storage 920 may include a mass storage, a removable storage, a volatile read-and-write memory, a read-only memory (ROM), or the like, or a combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 320 may store one or more programs and/or instructions to perform exemplary methods described in the present disclosure. For example, the storage 920 may store a program for the processing engine 840 for identifying a target from image data captured by one or more imaging device.

The I/O 930 may input and/or output signals, data, information, etc. In some embodiments, the I/O 930 may enable a user interaction with the processing engine 840. In some embodiments, the I/O 930 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 940 may be connected to a network (e.g., the network 820) to facilitate data communications. The communication port 940 may establish connections between the processing engine 840 and the monitoring component 820, the storage 880, and/or the terminal(s) 860. The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 940 may be and/or include a standardized communication port, such as RS232, RS485, etc. In some embodiments, the communication port 940 may be a specially designed communication port. For example, the communication port 940 may be designed in accordance with the digital imaging and communications in medicine (DICOM) protocol.

FIG. 10 is a schematic diagram illustrating exemplary hardware and/or software components of an exemplary mobile device 1000 on which the terminal(s) 860 may be implemented according to some embodiments of the present disclosure. As illustrated in FIG. 10, the mobile device 1000 may include a communication platform 1010, a display 1020, a graphic processing unit (GPU) 1030, a central processing unit (CPU) 1040, an I/O 1050, a memory 1060, and a storage 1070. In some embodiments, any other suitable component, including but not limited to a system bus or a controller (not shown), may also be included in the mobile device 1000. In some embodiments, a mobile operating system 1080 (e.g., iOS™, Android™, Windows Phone™, etc.) and one or more applications 1090 may be loaded into the memory 1060 from the storage 1090 in order to be executed by the CPU 1040. The applications 1080 may include a browser or any other suitable mobile apps for receiving and rendering information relating to image processing or other information from the processing engine 840. User interactions with the information stream may be achieved via the I/O 1050 and provided to the processing engine 840 and/or other components of the traffic surveillance system 800 via the network 850.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A method implemented on a computing device having at least one processor, a non-transitory storage medium and a communication platform connected to a network for traffic surveillance, the method comprising:
   acquiring, from a plurality of first video sensors, a first set of images of an area;
   generating a map-based surveillance interface of the area based on the first set of images, the map-based surveillance interface fusing the first set of images on a map and indicating correspondences between the first set of images and locations of the plurality of the first video sensors represented on the map;
   identifying a moving target from a first image of the first set of images;
   generating at least one object-based surveillance interface based on the identified moving target, the at least one object-based surveillance interface indicating correspondences between the moving target and the locations of the plurality of the first video sensors represented on the map; and
   presenting, on a display, the at least one object-based surveillance interface with the map-based surveillance interface;
   wherein
   each of the plurality of first video sensors is implemented on an illuminating device in the area, and
   the first set of images denotes a plurality of views of the area captured by the plurality of first video sensors, respectively, the method further comprises:
   determining one or more second images from the first set of images, each of the one or more second images including the moving target;
   determining a motion track of the moving target based on the first image and the one or more second images;
   generating a motion pattern of the moving target based on the motion track of the moving target in a period of time, the motion pattern of the moving target including a temporal motion pattern referring to a statistic based on the motion track of the moving target according to the period of time.

2. The method of claim 1, further comprising:
   acquiring, from a plurality of second video sensors, a second set of images of the area;
   generating the map-based surveillance interface of the area based on the first set of images and the second set of images,
   wherein the plurality of second video sensors are implemented on a plurality of motion objects in the area, respectively.

3. The method of claim 1, further comprising:
   determining one or more second images from the first set of images, each of the one or more second images including the moving target;
   determining a motion track of the moving target based on the first image and the one or more second images; and
   presenting, on the display, the motion track of the moving target on the map-based surveillance interface.

4. The method of claim 3, further comprising:
presenting the motion track of the moving target on the at least one object-based surveillance interface; and
presenting simultaneously, on the display, the at least one object-based surveillance interface with the map-based surveillance interface.

5. The method of claim 4, further comprising:
retrieving one or more features related to the moving target based on at least one of the first image and the one or more second images; and
presenting the one or more features related to the moving target on the at least one object-based surveillance interface,
wherein the one or more features include at least one of a location of the moving target, a velocity of the moving target, a color of the moving target, or a contour of the moving target.

6. The method of claim 1, further comprising:
determining one or more traffic statistics of the area based on the first set of images;
determining whether a violation occurs based on the one or more traffic statistics and traffic rules related to the area; and
in response to the determination that the violation occurs, transmitting an alarm signal via the network to a third party.

7. The method of claim 4, further comprising:
receiving, from a terminal device, an inquiry of an event;
retrieving information related to the event from the non-transitory storage medium; and
transmitting the information related to the event to be displayed on the terminal device in response to the inquiry,
wherein the information related to the event is displayed on the terminal device in at least one of a text, a form, a chart, the map-based surveillance interface, or the at least one object-based surveillance interface.

8. A non-transitory computer readable medium, comprising:
instructions being executed by at least one processor, causing the at least one processor to implement a method for lighting control, comprising:
acquiring, from a plurality of first video sensors, a first set of images of an area;
generating a map-based surveillance interface of the area based on the first set of images, the map-based surveillance interface fusing the first set of images on a map and indicating correspondences between the first set of images and locations of the plurality of the first video sensors represented on the map;
identifying a moving target from a first image of the first set of images;
generating at least one object-based surveillance interface based on the identified moving target, the at least one object-based surveillance interface indicating correspondences between the moving target and the locations of the plurality of the first video sensors represented on the map; and
presenting, on a display, the at least one object-based surveillance interface with the map-based surveillance interface;
wherein
each of the plurality of first video sensors is implemented on an illuminating device in the area, and
the first set of images denotes a plurality of views of the area captured by the plurality of first video sensors, respectively, the method further comprises:
determining one or more second images from the first set of images, each of the one or more second images including the moving target;
determining a motion track of the moving target based on the first image and the one or more second images;
generating a motion pattern of the moving target based on the motion track of the moving target in a period of time, the motion pattern of the moving target including a temporal motion pattern referring to a statistic based on the motion track of the moving target according to the period of time.

9. The non-transitory computer readable medium of claim 8, wherein the method further comprises:
acquiring, from a plurality of second video sensors, a second set of images of the area, each of the plurality of second video sensors being implemented on a motion object in the area; and
generating the map-based surveillance interface of the area based on the first set of images and the second set of images.

10. The non-transitory computer readable medium of claim 9, wherein the method further comprises:
determining one or more second images from the first set of images, each of the one or more second images including the moving target;
determining a motion track of the moving target based on the first image and the one or more second images; and
presenting, on the display, the motion track of the moving target on the map-based surveillance interface.

11. The non-transitory computer readable medium of claim 10, wherein the method further includes:
presenting the motion track of the moving target on the at least one object-based surveillance interface; and
presenting simultaneously, on the display, the at least one object-based surveillance interface with the map-based surveillance interface.

12. A system for traffic surveillance, comprising:
a non-transitory storage medium storing executable instructions for traffic surveillance;
a communication platform connected to a network;
a plurality of first video sensors configured to capture a first set of images of an area, respectively, each of the plurality of first video sensors being implemented on an illuminating devices in the area;
at least one processor in communication with the non-transitory storage medium, when executing the executable instructions, the at least one processor is configured to:
generate a map-based surveillance interface of the area based on the first set of images, the map-based surveillance interface using the first set of images on a map and indicating correspondences between the first set of images and locations of the plurality of the first video sensors represented on the map;
identify a moving target from a first image of the first set of images;
generate at least one object-based surveillance interface based on the identified moving target, the at least one object-based surveillance interface indicating correspondences between the moving target and the locations of the plurality of the first video sensors represented on the map; and
present the at least one object-based surveillance interface with the map-based surveillance interface on a display, wherein the at least one processor is further configured to:
    generate a motion pattern of the moving target based on the motion track of the moving target in a period of time; and
    activate at least one of the plurality of first video sensors to monitor the moving target based on the motion pattern,
    wherein the motion pattern includes at least one of a temporal motion pattern, a spatial motion pattern, or a social behavioral motion pattern.

13. The system of claim 12, further comprising:
    a plurality of second video sensors configured to capture a second set of images of the area, each of the plurality of second video sensors being implemented on a motion object in the area,
    wherein the at least one processor is further configured to generate the map-based surveillance interface of the area based on the first set of images and the second set of images.

14. The system of claim 12, wherein the at least one processor is further configured to:
    determine one or more second images from the first set of images, each of the one or more second images including the moving target;
    determine a motion track of the moving target based on the first image and the one or more second images; and
    present, on the display, the motion track of the moving target on the map-based surveillance interface.

15. The system of claim 14, wherein the at least one processor is further configured to:
    present the motion track of the moving target on the at least one object-based surveillance interface; and
    present simultaneously, on the display, the at least one object-based surveillance interface with the map-based surveillance interface.

16. The system of claim 15, wherein the at least one processor is further configured to:
    retrieve one or more features related to the moving target based on at least one of the first image and the one or more second images; and
    present the one or more features related to the moving target on the at least one object-based surveillance interface,
    wherein the one or more features include at least one of a location of the moving target, a velocity of the moving target, a color of the moving target, or a contour of the moving target.

17. The system of claim 12, wherein the at least one processor is further configured to:
    determine one or more traffic statistics of the area based on the first set of images;
    determine whether a violation occurs based on the one or more traffic statistics and traffic rules related to the area; and
    in response to the determination that the violation occurs, transmit an alarm signal via the network to a third party.

18. The system of claim 15, wherein the at least one processor is further configured to:
    receive, from a terminal device, an inquiry of an event;
    retrieve information related to the event from the non-transitory storage medium; and
    transmit the information related to the event to be displayed on the terminal device in response to the inquiry,
    wherein the information related to the event is displayed on the terminal device in at least one of a text, a form, a chart, the map-based surveillance interface, or the at least one object-based surveillance interface.

* * * * *